(12) United States Patent
Nakamura

(10) Patent No.: US 7,742,102 B2
(45) Date of Patent: Jun. 22, 2010

(54) EXTENDABLE PIVOT SHAFT MECHANISM, AND AN EXTENDABLE PIVOT SHAFT MECHANISM OF A CAMERA FOR PIVOTING A ROTATABLE GRIP ON A CAMERA BODY

(75) Inventor: Yoshikazu Nakamura, Saitama (JP)

(73) Assignee: Hoya Corporation, Tokyo (JP)

( * ) Notice: Subject to any disclaimer, the term of this patent is extended or adjusted under 35 U.S.C. 154(b) by 1449 days.

(21) Appl. No.: 11/121,062

(22) Filed: May 4, 2005

(65) Prior Publication Data
US 2005/0253959 A1  Nov. 17, 2005

(30) Foreign Application Priority Data
May 12, 2004 (JP) .............. 2004-142890

(51) Int. Cl.
*H04N 5/225* (2006.01)
(52) U.S. Cl. ..................... 348/376
(58) Field of Classification Search ......... 396/419–428; 348/373–376, 207.99; 352/243
See application file for complete search history.

(56) References Cited

U.S. PATENT DOCUMENTS

| | | | |
|---|---|---|---|
| 4,530,580 A * | 7/1985 | Ueda et al. .............. | 396/425 |
| 5,442,453 A | 8/1995 | Takagi et al. | |
| 2004/0095500 A1 * | 5/2004 | Sato et al. .............. | 348/340 |

FOREIGN PATENT DOCUMENTS

| | | |
|---|---|---|
| JP | 47-2033 | 2/1972 |
| JP | 1-231481 | 9/1989 |
| JP | 5-11011 | 2/1993 |
| JP | 6-98210 | 4/1994 |
| JP | 10-133273 | 5/1998 |
| JP | 2000-343935 | 12/2000 |
| JP | 2002-49463 | 2/2002 |

OTHER PUBLICATIONS

U.S. Appl. No. 11/121,095 to Nakamura et al., which was filed on May 4, 2005.
U.S. Appl. No. 11/121,074 to Nakamura, which was filed on May 4, 2005.
U.S. Appl. No. 11/070,261 to Seo, which was filed on Mar. 3, 2005.
English language Abstract of JP 10-133273, May 22, 1998.
English language Abstract of JP 2000-343935, Dec. 12, 2000.
English language Abstract of JP 1-231481, Sep. 14, 1989.
English language Abstract of JP 2002-49463, Feb. 15, 2002.

* cited by examiner

*Primary Examiner*—Jason Whipkey
(74) *Attorney, Agent, or Firm*—Greenblum & Bernstein P.L.C.

(57) ABSTRACT

An extendable pivot shaft mechanism of a camera for pivoting a rotatable grip on a camera body is provided to allow the rotatable grip both to rotate about a rotational axis and to move along the rotational axis relative to the camera body, the extendable pivot shaft mechanism includes an inner shaft, a middle cylinder and an outer cylinder which are concentrically arranged about the rotational axis. The inner shaft and the outer cylinder are fixed to one and the other of the grip and the camera body, respectively. One of the inner shaft and the outer cylinder serves as a rotatable shaft element which is rotatable about the rotational axis relative to the middle cylinder. The other of the inner shaft and the outer cylinder serves as a linearly movable shaft element which is linearly movable along the rotational axis relative to the middle cylinder.

17 Claims, 29 Drawing Sheets

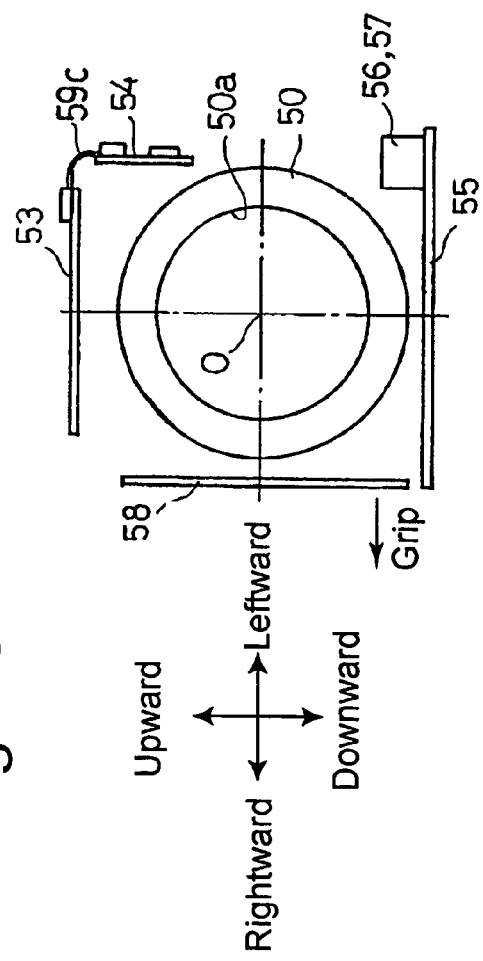
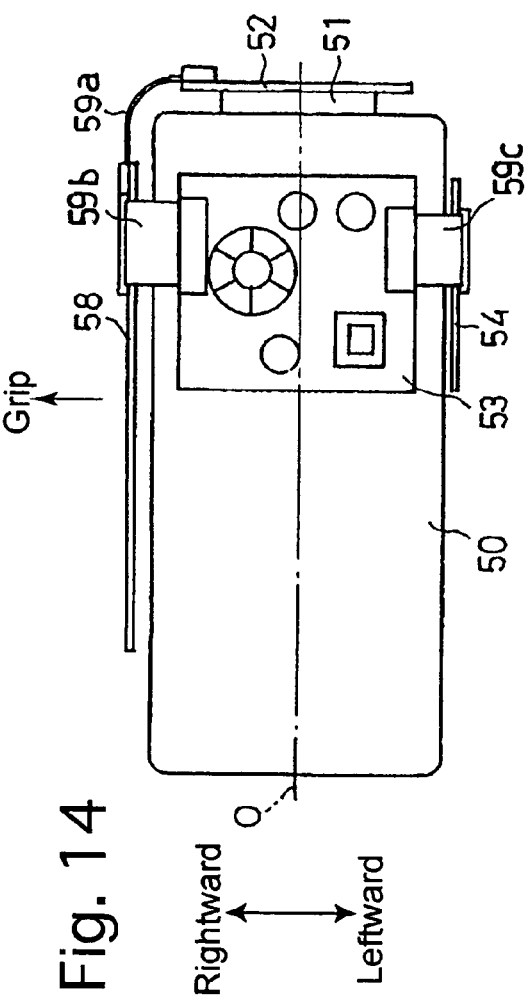
Fig. 13
Fig. 14

1

EXTENDABLE PIVOT SHAFT MECHANISM, AND AN EXTENDABLE PIVOT SHAFT MECHANISM OF A CAMERA FOR PIVOTING A ROTATABLE GRIP ON A CAMERA BODY

BACKGROUND OF THE INVENTION

1. Field of the Invention

The present invention relates to an extendable pivot shaft mechanism of a camera for pivoting a rotatable grip on a camera body, and also relates to an extendable pivot shaft mechanism incorporated in various apparatuses including a camera.

2. Description of the Related Art

A conventional mechanism (extendable pivot shaft mechanism) for connecting two devices with each other to allow the two devices both to rotate about a rotational axis relative to each other and to move along the rotational axis relative to each other is difficult to construct so as to operate smoothly without increasing the size of the mechanism. For instance, the assignee of the present invention has found that providing a camera body with a rotatable grip capable of both rotating about a rotational axis and moving along the rotational axis relative to the camera body via the extendable pivot shaft mechanism improves the operability of the camera. However, in precision apparatuses, especially in precision equipment such as a camera which is provided with an extendable pivot shaft mechanism for pivoting a rotatable grip on a camera body, smooth operation and miniaturization of the extendable pivot shaft mechanism are required. In addition, it is desirable that an electrical connecting elements (e.g., lead wires or a flexible PWB (printed-wiring board)), for electrically connecting two devices with each other such as a camera body and a rotatable grip pivoted on the camera body, be installed through the extendable pivot shaft mechanism for the purpose of reducing the space that the electrical connecting elements occupy. However, it is difficult to install such an electrical connecting elements through a conventional extendable pivot shaft mechanism, e.g., disclosed in Japanese laid-open patent publication H06-98210.

SUMMARY OF THE INVENTION

The present invention provides an extendable pivot shaft mechanism of a camera for pivoting a rotatable grip on a camera body so that the rotatable grip can both rotate about a rotational axis and move along the rotational axis relative to the camera body, wherein the extendable pivot shaft mechanism is compact and operates smoothly. The present invention further provides an extendable pivot shaft mechanism for connecting two electrically-connected devices with each other to allow the two devices both to relatively rotate about a rotational axis and to relatively move along the rotational axis, wherein both miniaturization and smooth operation of the extendable pivot shaft mechanism are achieved.

According to an aspect of the present invention, an extendable pivot shaft mechanism of a camera for pivoting a rotatable grip on a camera body to allow the rotatable grip both to rotate about a rotational axis and to move along the rotational axis relative to the camera body, wherein the extendable pivot shaft mechanism includes an inner shaft, a middle cylinder and an outer cylinder which are concentrically arranged about the rotational axis. The inner shaft and the outer cylinder are fixed to one and the other of the grip and the camera body, respectively. One of the inner shaft and the outer cylinder serves as a rotatable shaft element which is rotatable about the rotational axis relative to the middle cylinder, and the other of the inner shaft and the outer cylinder serves as a linearly movable shaft element which is linearly movable along the rotational axis relative to the middle cylinder.

It is desirable for one end of the rotatable shaft element is fixed to a pivot support member installed in the one of the grip and the camera body, another end of the rotatable shaft element includes a radial projection. The middle cylinder is sandwiched between the radial projection and the pivot support member in a direction of the rotational axis to be prevented from moving in the rotational axis direction relative to the pivot support member.

It is desirable for the radial projection to be integral with the rotatable shaft element.

It is desirable for the radial projection to be formed as an outer flange formed integral with the rotatable shaft element.

It is desirable for the radial projection to be provided as a radial member independent of the rotatable shaft element, the radial member being fixed to the rotatable shaft element during an assembling operation of the extendable pivot shaft mechanism.

It is desirable for the radial projection to be formed as a ring member.

It is desirable for the linearly movable shaft element to include at least one linear guide groove formed on a peripheral surface of the linearly movable shaft element which faces the middle cylinder to extend parallel to the rotational axis, and for the middle cylinder to include at least one radial projection which is slidably engaged in the linear guide groove.

It is desirable for the extendable pivot shaft mechanism to include a click-stop mechanism, provided between the middle cylinder and the linearly movable shaft element, for stopping the linearly movable shaft element moving along the rotational axis relative to the middle cylinder with a click action when the middle cylinder and the linearly movable shaft element relatively move along the rotational axis.

It is desirable for the extendable pivot shaft mechanism to include a click-stop mechanism, provided between the middle cylinder and the rotatable shaft element, for stopping the rotatable shaft element rotating about the rotational axis relative to the middle cylinder with a click action when the middle cylinder and the rotatable shaft element relatively rotate about the rotational axis.

It is desirable for the outer cylinder to serve as the linearly movable shaft element, wherein the click-stop mechanism includes at least one click recess formed on an outer peripheral surface of the middle cylinder; at least one ball accommodation hole formed on the outer cylinder as a through-hole extending in a radial direction of the outer cylinder, a radially inner opening of the ball accommodation hole facing the click recess when the axial positions of the ball accommodation hole and the click recess are aligned, and a radially outer opening of the ball accommodation hole facing an outer peripheral surface of the outer cylinder; at least one click ball accommodated in the ball accommodation hole to be movable therein in the radial direction of the outer cylinder; and at least one spring accommodated in the ball accommodation hole for biasing the click ball toward the middle cylinder. The extendable pivot shaft mechanism includes an external cylindrical cover which is positioned around an outer peripheral surface of the outer cylinder to cover the outer opening of the ball accommodation hole. One end of the spring accommodated in the ball accommodation hole is in contact with an inner peripheral surface of the external cylindrical cover, and the other end of the spring is in contact with the click ball.

It is desirable for the inner shaft and the outer cylinder to be fixed to the grip and the camera body, respectively.

It is desirable for the rotatable shaft element to be fixed to the grip, and for the linearly movable shaft element to be fixed to the camera body.

It is desirable for the extendable pivot shaft mechanism to include a grip-angle holding device installed between the rotatable shaft element and the middle cylinder to apply a frictional resistance to the rotatable shaft element and the middle cylinder therebetween in a rotational direction.

It is desirable for the grip-angle holding device to include a leaf spring.

It is desirable for the inner shaft to be formed as a cylindrical member having a through-hole which extends in a direction of the rotational axis, at least one electrical connecting element, for electrically connecting the grip and the camera body with each other, extending between the grip and the camera body via the through-hole.

It is desirable for the electrical connecting element to include a bundle of lead wires.

It is desirable for the rotational axis to extend in a direction orthogonal to an optical axis of a photographing optical system of the camera which is provided in the camera body.

It is desirable for the rotatable grip to include a shutter release button.

In an embodiment, an extendable pivot shaft mechanism of a camera is provided for pivoting a rotatable grip on a camera body to allow the rotatable grip both to rotate about a rotational axis and to move along the rotational axis relative to the camera body, the extendable pivot shaft mechanism including a body-side cylindrical shaft member fixed to the camera body; a middle cylindrical shaft member supported by the body-side cylindrical shaft member to be capable of one of rotating about the rotational axis and moving along the rotational axis, relative to the body-side cylindrical shaft member; and a grip-side cylindrical shaft member fixed to the grip to be capable of the other of the rotating about the rotational axis and the moving along the rotational axis, relative to the middle cylindrical shaft member.

In an embodiment, an extendable pivot shaft mechanism for connecting two electrically-connected devices with each other to allow the two electrically-connected devices both to relatively rotate about a rotational axis and to relatively move along the rotational axis is provided, wherein the extendable pivot shaft mechanism includes an inner cylinder, a middle cylinder and an outer cylinder, which are concentrically arranged about the rotational axis, each of the inner cylinder, the middle cylinder and the outer cylinder including a through-hole which extends in a direction of the rotational axis. The inner cylinder and the outer cylinder are fixed to one and the other of the two electrically-connected devices, respectively. One of the inner cylinder and the outer cylinder serves as a rotatable shaft element which is rotatable about the rotational axis relative to the middle cylinder. The other of the inner cylinder and the outer cylinder serves as a linearly movable shaft element which is linearly movable along the rotational axis relative to the middle cylinder. At least one electrical connecting element for electrically connecting the two electrically-connected devices with each other extends between the two electrically-connected devices via the through-hole of the inner cylinder.

According to the extendable pivot shaft mechanism to which the present invention is applied, the rotatable grip can both rotate about the rotational axis and move along the rotational axis smoothly relative to the camera body because a shaft member (the rotatable shaft element), which takes charge of supporting rotational movements of the pivot shaft mechanism, and another shaft member (the linearly movable shaft element), which takes charge of giving support to linear forward/inverse movements of the pivot shaft mechanism, are independent of each other. In addition, the number of elements of the pivot shaft mechanism can be reduced because these two shaft members (the rotatable shaft element and the linearly movable shaft element) are guided by a common member: the middle cylinder. Moreover, the pivot shaft mechanism can be designed in a space-saving manner because the three-layered cylinders: the rotatable shaft element, the linearly movable shaft element and the middle cylinder, are concentrically arranged, which makes it possible to achieve a compact pivot shaft mechanism. Furthermore, the two electrically-connected devices (e.g., a camera body and a rotatable grip pivoted to the camera body) can be electrically connected with each other with the pivot shaft mechanism remaining compact (small) by constructing the radially innermost shaft member as a cylindrical member and further making the electrical connecting elements pass through the cylindrical member for the installation thereof.

The present disclosure relates to subject matter contained in Japanese Patent Application No. 2004-142890 (filed on May 12, 2004) which is expressly incorporated herein by reference in its entirety.

BRIEF DESCRIPTION OF THE DRAWINGS

The present invention will be described below in detail with reference to the accompanying drawings in which:

FIG. 13 is a front elevational view of internal elements of the digital camera shown in FIGS. 1 and 2, showing internal circuitry of the camera body;

FIG. 14 is a plan view of the internal elements shown in FIG. 13;

DESCRIPTION OF THE PREFERRED EMBODIMENTS

Figure 1:
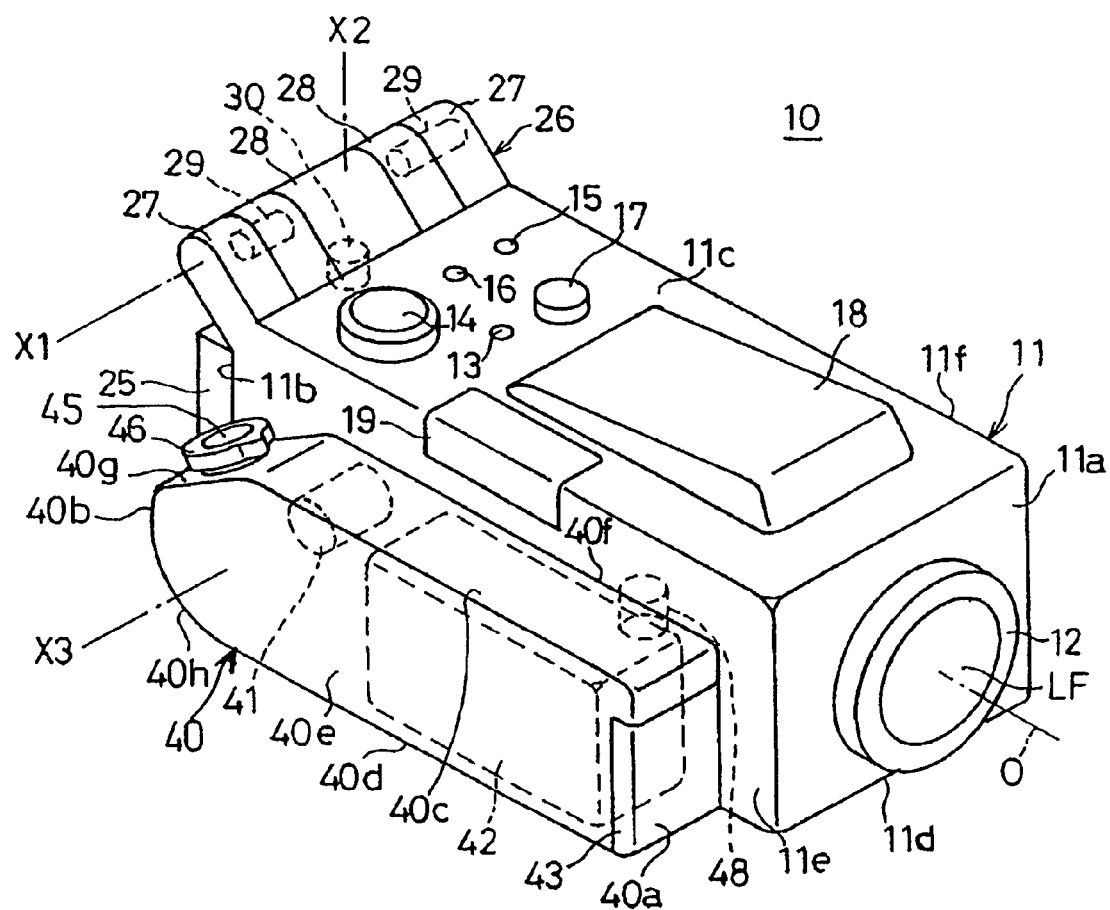
FIG. 1 is a perspective view of an embodiment of a digital camera having a pivot shaft mechanism according to the present invention.
Figure 2:
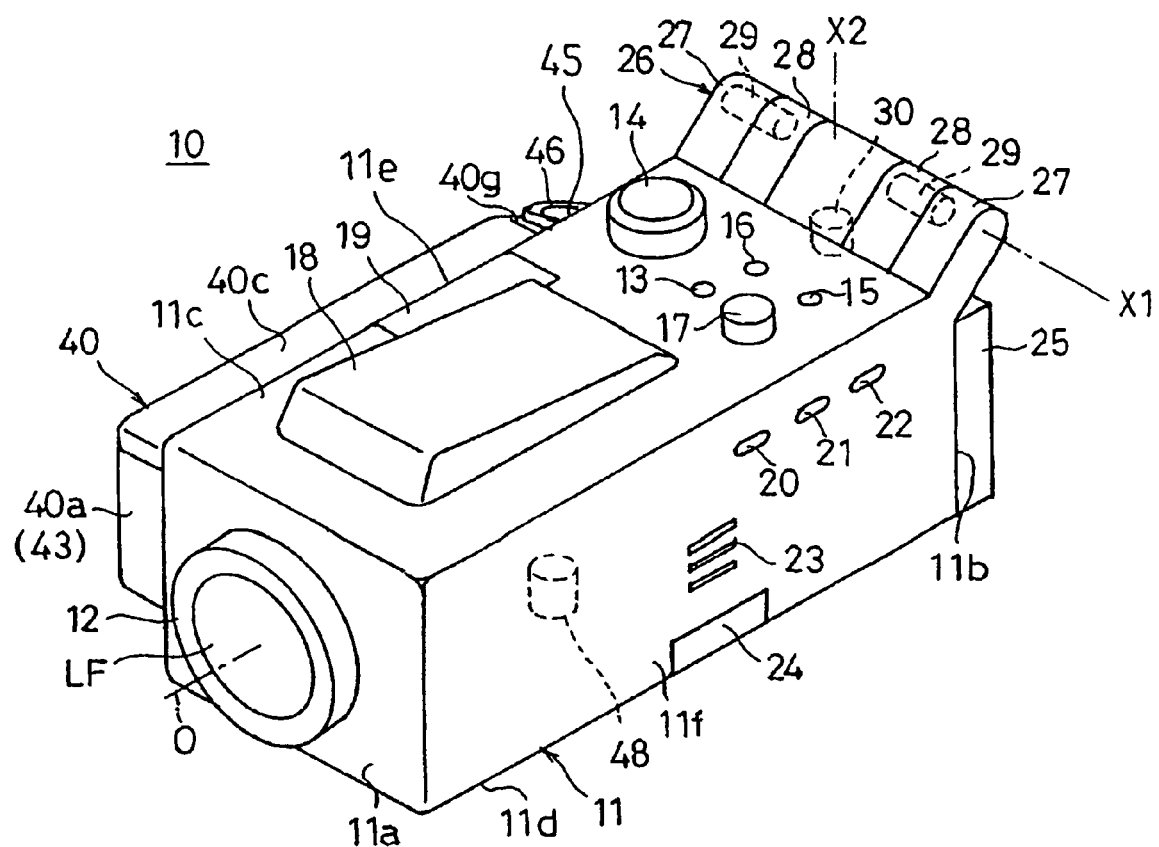
FIG. 2 is a perspective view of the digital camera shown in FIG. 1, viewed from a different angle.
Figure 3:
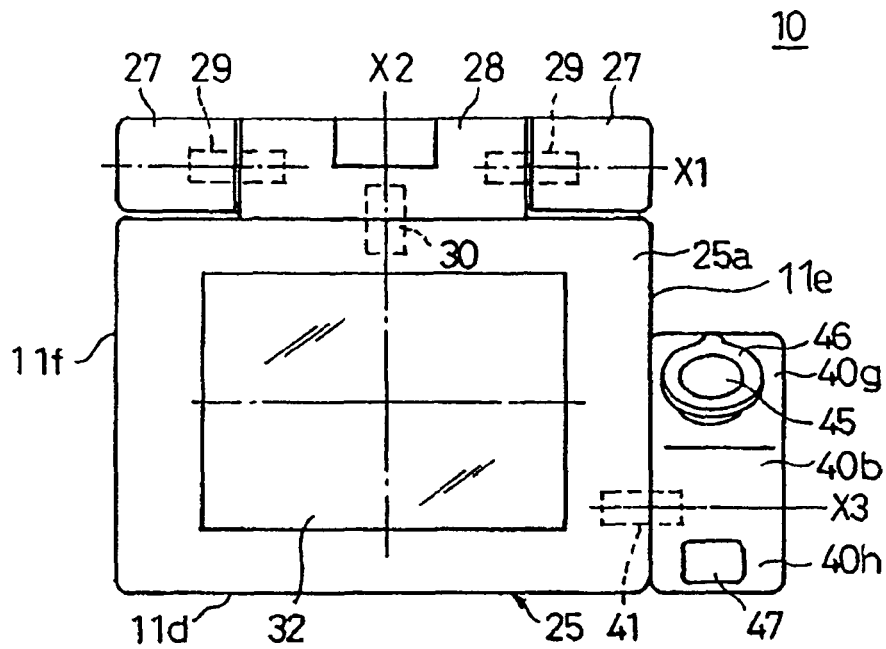
FIG. 3 is a rear elevational view of the digital camera shown in FIGS. 1 and 2.

FIGS. 1 through 12 show an embodiment of a digital camera having a pivot shaft mechanism according to the present invention. The digital camera 10 is provided with a camera body 11 including a photographing optical system. The camera body 11 is formed as a substantially rectangular parallelepiped which is elongated along an optical axis O of the photographing optical system. The outer surface of the camera body 11 is composed of six surfaces: a front end surface 11a, a rear end surface 11b, a top surface 11c, a bottom surface 11d, a right side surface 11e, and a left side surface 11f. The top surface 11c, the bottom surface 11d, the right side surface 11e, and the left side surface 11f connect the front end surface 11a with the rear end surface 11b, and surround the optical axis O. In the present embodiment of the digital camera, the vertical direction and the horizontal direction of FIGS. 3, 11 and 12 correspond to the vertical direction and the horizontal direction of the digital camera 10, respectively. More specifically, the right-hand side of the digital camera 10 with respect to the rear side thereof (as viewed from the right-hand side shown in FIG. 3) is defined as the right-hand side of the digital camera 10, while the left-hand side of the digital camera 10 with respect to the rear side thereof is defined as the left-hand side of the digital camera 10. In addition, a direction parallel to the optical axis O is defined as a forward/rearward direction of the digital camera 10, the front end surface 11a is defined as the front side of the digital camera 10, and the rear end surface 11b is defined as the rear side of the digital camera 10.

The digital camera 10 is provided in the camera body 11 with a frontmost lens group LF of the photographing optical system which is exposed to the outside of the camera body 10 from the front end surface 11a. The frontmost lens group LF can be a lens group consisting of a single lens element or a plurality of lens elements. The camera body 11 is provided, on the front end surface 11a around the frontmost lens group LF, with a filter mounting screw 12 by which an accessory such as a filter can be attached to the front of the frontmost lens group LF. The photographing optical system of the digital camera 10, that is provided inside the camera body 11, is a zoom lens optical system having more than one lens group in addition to the frontmost lens group LF. Specifically, the photographing optical system is an internal-focusing/zooming optical system in which the focus or the focal length is altered by moving elements internally within the lens barrel (i.e., the external lens barrel is not extended or retracted). Accordingly, the frontmost lens group LF does not move forward from the position thereof shown in the drawings.

The digital camera 10 is provided, on the top surface 11c of the camera body 11 in an area thereon close to the rear end surface 11b, with a mode select dial 14 and various manual operational buttons such as a power button 13, a playback button 15, a menu button 16 and a multi-direction button 17. The power button 13 serves as a manual operational member for turning ON and OFF a main switch of the digital camera 10. The mode select dial 14 serves as a manual operational member for selecting a desired photographing mode from among different photographing modes. The playback button 15 serves as a manual operational member for reproducing stored images on a liquid crystal display (LCD) portion 32. Upon an operation of the menu button 16, the digital camera 10 enters a setting changing mode in which various settings on the digital camera 10 can be changed and set by operating the multi-direction button 17. The multi-direction button 17 is also used to switch playback images to be displayed on the LCD portion 32. Various settings which can be changed by operating the menu button 16 include the settings of storing image size, image quality, white balance and sensitivity, but are not limited solely to theses specific settings. The multi-direction button 17 is made of a momentary switch which can be operated to move in different directions. For instance, the multi-direction button 17 can be operated in biaxial directions orthogonal to each other (four directions: forward, rearward, right and left), and also in a press-down direction at an intersection of the aforementioned biaxial directions, i.e., at the center thereof. The digital camera 10 is provided, on top: of the camera body 11, in front of the various manual operational buttons, with a pop-up flash 18. The pop-up flash 18 can be switched between a pop-up position in which a light emitting portion of the pop-up flash 18 projects upwards from the top surface 11c of the camera body 11, and a retracted position in which the light emitting portion of the pop-up flash 18 is retracted into the top surface 11c of the camera body 11. In each of FIGS. 1 through 12, the pop-up flash 18 is in the retracted position, and accordingly, the light emitting portion of the pop-up flash 18 is not shown. The camera body 11 is provided in the vicinity of the ridge (border) between the upper surface 11c and the right side surface 11e with a card slot lid 19 for covering a card slot (not shown) formed on the camera body 11. This card slot is accessible from the outside of the camera body 11 by opening the card slot lid 19. In a state in which the cart slot lid 19 is open, a memory card in which image data are stored can be inserted and removed into and from the memory card slot.

The digital camera 10 is provided, on the left side surface 11f of the camera body 11 at regular intervals in the optical axis direction, with a flash mode select button 20, a drive mode select button 21 and a focus mode select button 22. The flash mode select button 20, the drive mode select button 21 and the focus mode select button 22 are positioned in substantially the same range, in the optical axis direction, as the aforementioned various manual operational members (13 through 17) in the optical axis direction. The flash mode select button 20 serves as a manual operational member for controlling the operation of the light emitting portion of the pop-up flash 18. By operating the flash mode select button 20, a desired flash mode can be selected from among different flash modes such as auto flash mode, compulsory flash mode, suppressed flash mode and red-eye reduction mode. The drive mode select button 21 serves as a manual operational button for selecting a drive mode at a shutter release from among different drive modes such as normal drive mode (single-frame mode), multi-frame consecutive photographing mode, self-timer photographing mode and auto-bracketing photographing mode. The focus mode select button 22 serves as a manual operational member for selecting a focus mode from among different focus modes such as normal auto focus mode, macro (close-up) photographing mode, infinity photographing mode and manual focus mode. The digital camera 10 is provided, on the left side surface 11f of the camera body 11 slightly in front of the flash select button 20, with speaker slits 23, and is further provided, on the camera body 11 below the speaker slits 23, with an external connector cover 24. The external connector cover 24 can be opened and closed (or detached and attached) with respect to the left side surface 11f of the camera body 11.

The digital camera 10 is provided at the back of the camera body 11 (on the rear end surface 11b) with an LCD monitor unit 25 which is mounted to the camera body 11 via a hinge portion 26 formed along the ridge (border) between the rear end surface 11b and the top surface 11c. The hinge portion 26 includes a pair of support arms 27, a middle support arm 28 and a pair of pivot pins 29. The pair of support arms 27 project from the camera body 11 at positions thereon laterally apart from each other. The middle support arm 28 to which the LCD monitor unit 25 is fixed to be supported thereby is held between the pair of support arms 27. The pair of pivot pins 29 project in opposite lateral directions away from each other from opposite ends of the middle support arm 28 to be respectively inserted into pin holes of the pair of support arms 27. Due to this structure of the hinge portion 26, the pair of support arms 27 and the middle support arm 28 can rotate relative to each other about the pair of pivot pins 29. An axis X1 of the pair of pivot pins 29 extends in a lateral direction of the digital camera 10 that is orthogonal to the optical axis O. The LCD monitor unit 25 can be manually rotated about the axis X1 between a retracted position (seated position; the position shown in FIGS. 4 and 9) in which the LCD monitor unit 25 is positioned on the rear end surface 11b to sit on the optical axis O, and a maximum rotated position (the position shown by two-dot chain lines in FIG. 8) in which the LCD monitor unit 25 is fully rotated forward (clockwise as viewed in FIG. 8) about the pair of pivot pins 29 so that an edge of the LCD monitor unit 25 which is on the opposite side of the LCD monitor unit 25 from the middle support arm 28 is positioned above the hinge portion 26. When in the retracted position, the LCD monitor unit 25 lies in a plane substantially orthogonal to the optical axis O. It is desirable that the range of rotation of the LCD monitor unit 25 between the retracted position and the maximum rotated position be equal to or greater than 180 degrees. In the present embodiment of the digital camera, the range of rotation of the LCD monitor unit 25 is set at about 210 degrees.

Figure 10:
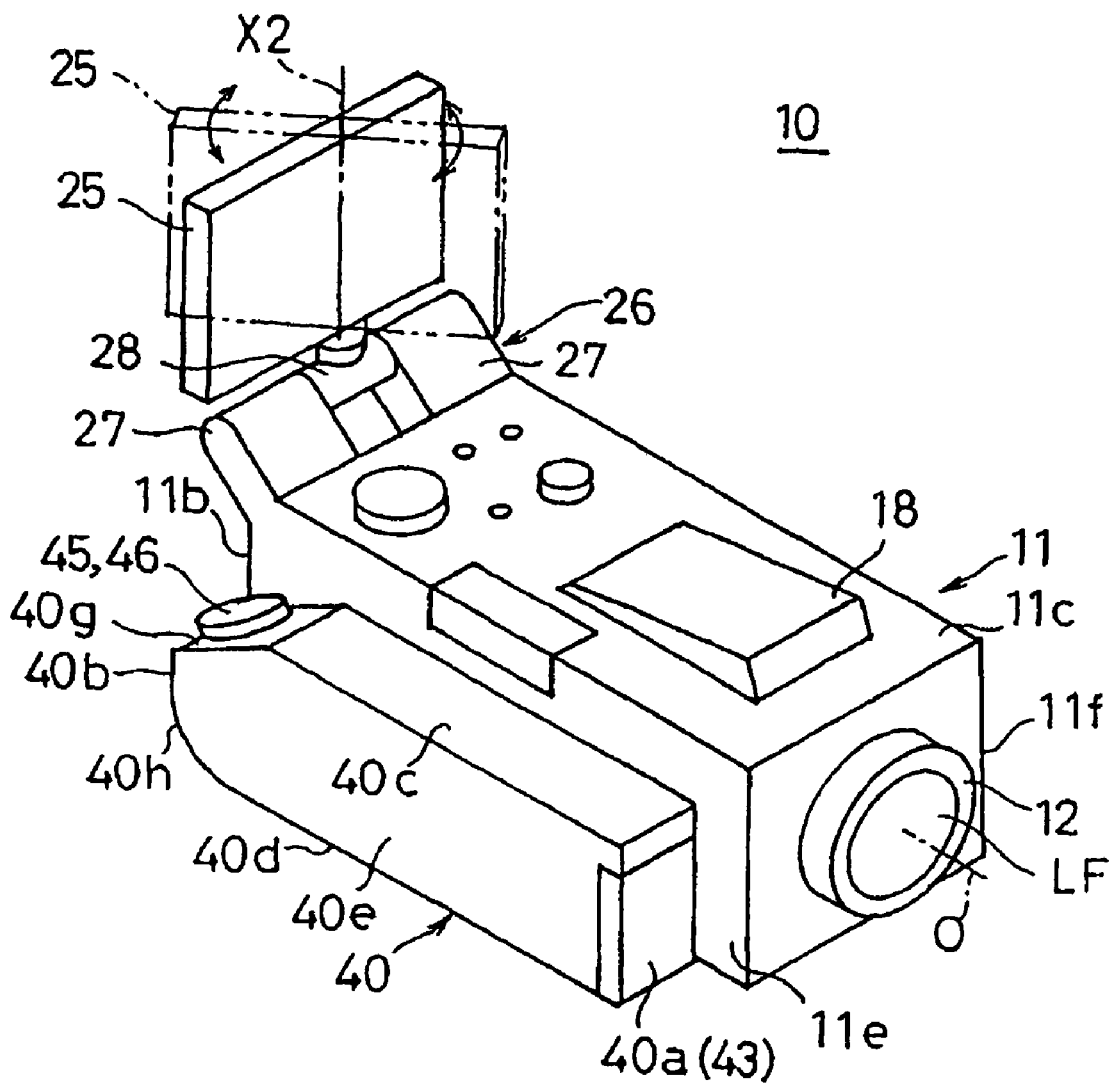
FIG. 10 is a front view in perspective of the digital camera shown in FIGS. 1 and 2, showing a state in which the LCD monitor unit is in an upright position.

As shown in FIG. 10, the LCD monitor unit 25 is supported by the middle support arm 28 to be rotatable on an axis. X2 orthogonal to the axis X1. More specifically, a rotational pin 30 projects from a rectangular frame portion 25a of the LCD monitor unit 25 along the axis X2 thereon, while a pin-insertion hole in which the rotational pin 30 is rotatably fitted is formed on the middle support arm 28. Accordingly, the LCD monitor unit 25 is rotatable on both of the axes X1 and X2.

Although the pair of pivot pins 29 project from the middle support arm 28 to be respectively inserted into the pin holes formed on the pair of support arms 27 in the hinge portion 26 in the above illustrated embodiment of the digital camera 10, it is possible for the pair of pivot pins 29 to project from the pair of support arms 27 to be respectively inserted into pin holes formed on the middle support arm 28.

Although the rotational pin 30 projects from the rectangular frame portion 25a of the LCD monitor unit 25 to be rotatably fitted into the pin-insertion hole formed on the middle support arm 28 in the above illustrated embodiment of the digital camera 10, it is possible for the rotational pin 30 to project from the middle support arm 28 to be rotatably fitted into a pin-insertion hole formed on the rectangular frame portion 25a of the LCD monitor unit 25.

Figure 4:
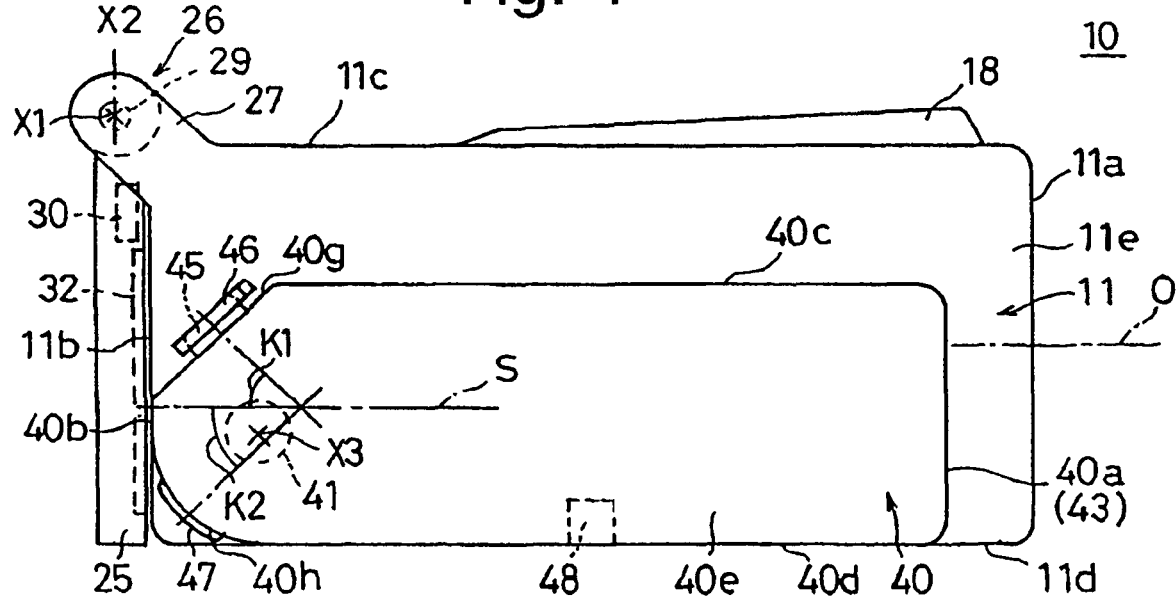
FIG. 4 is a side elevational view of the digital camera shown in FIGS. 1 and 2, viewed from the grip side.
Figure 9:
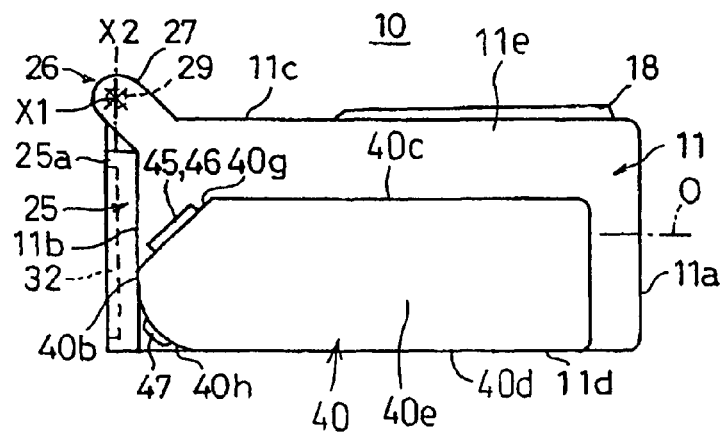
FIG. 9 is a view similar to that of FIG. 4 and shows a state in which the LCD monitor unit is reversed from the position shown in FIG. 4.
Figure 7:
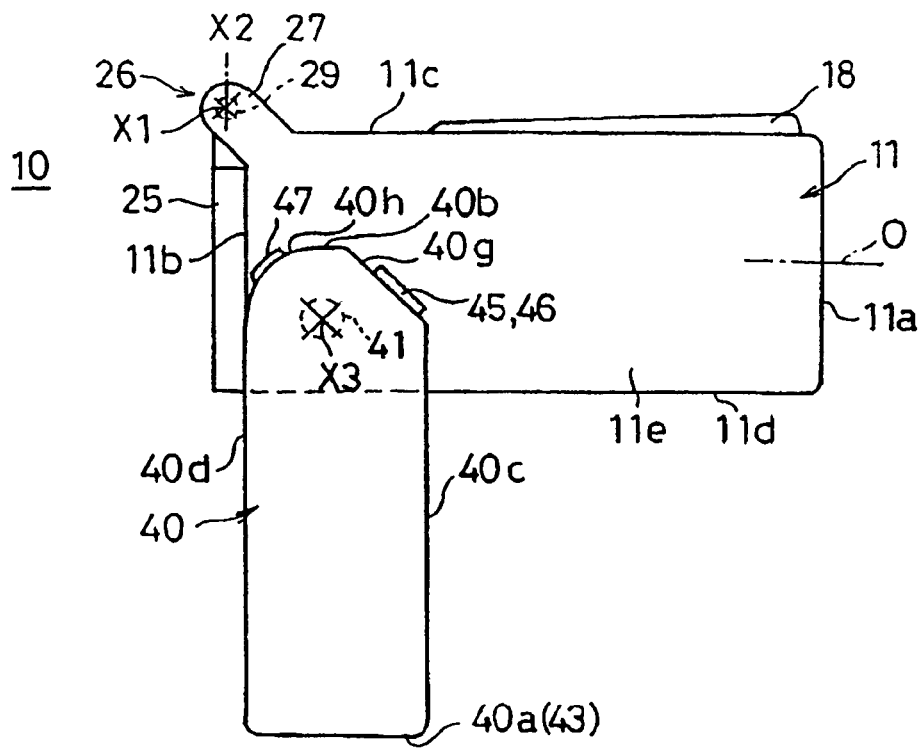
FIG. 7 is a side elevational view of the digital camera shown in FIGS. 1 and 2, showing a state in which the grip is rotated to extend downwards from the camera body.

The frame portion 25a of the LCD monitor unit 25 is provided with four edge portions surrounding the rectangular LCD portion 32. The shape and size of the LCD monitor unit 25 are determined so that three of the four edge portions of the frame portion 25a, except for one of the four edge portions which is adjacent to the middle support portion 28, are substantially flush with the bottom surface 11d, the right side surface 11e and the left side surface 11f, respectively, when the LCD monitor unit 25 is in the retracted position, in which the LCD monitor unit 25 is positioned on the rear end surface 11b of the camera body 11 as shown in FIGS. 4 and 9 (see FIGS. 3 through 9).

Figure 8:
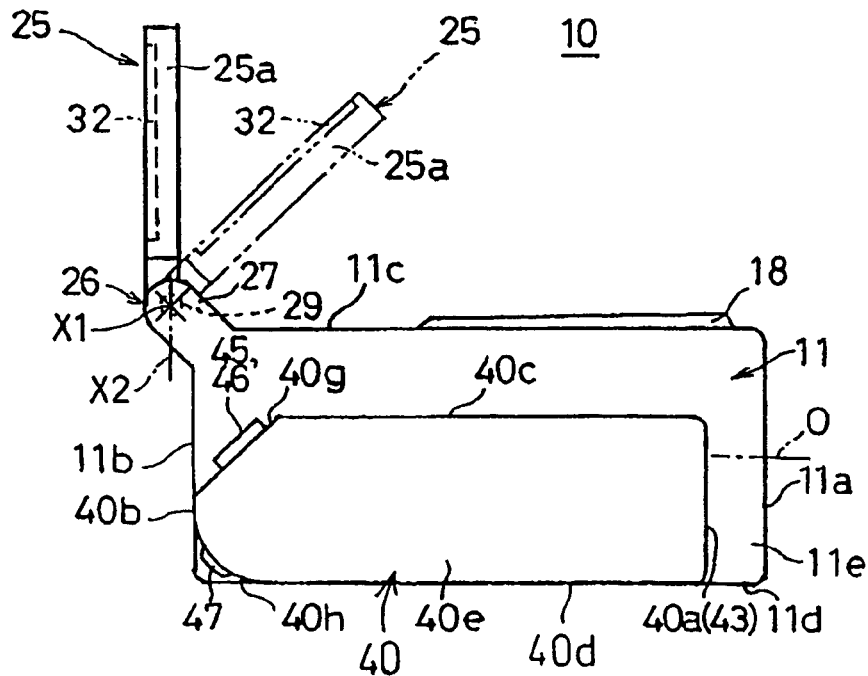
FIG. 8 is a side elevational view of the digital camera shown in FIGS. 1 and 2, showing a state in which an LCD monitor unit is in an upright position.

If the LCD monitor unit 25 is rotated about the axis X1 to stand vertically as shown in FIG. 8 (from the state shown in FIG. 4 in which the LCD portion 32 faces the rear end surface 11b of the camera body 11), the LCD portion 32 faces rearwards (usually toward the user of the digital camera) so that the LCD portion 32 can be used as a monitor for showing the view through the photographing optical system or displaying stored images during playback. Although FIG. 8 shows only two states of the LCD monitor unit 25: a state of the LCD monitor unit 25 that is rotated by approximately 180 degrees from the retracted state thereof to stand vertically (the LCD monitor unit 25 shown by solid lines in FIG. 8), and a state of the LCD monitor unit 25 that is positioned in the aforementioned maximum rotated position (the position shown by two-dot chain lines in FIG. 8), the hinge portion 26 is provided with a frictional mechanism (or a click mechanism) by which the LCD monitor unit 25 can be stopped at other angular positions between the retracted position and the maximum rotated position.

The LCD portion 32 in an upright position can be made to face toward the front of the digital camera 10 by rotating the LCD monitor unit 25 about the axis X2 as shown in FIG. 10. Orientating the LCD portion 32 so as to face the front of the digital camera 10 is suitable for the case where the user photographs himself/herself (self portrait) while holding the digital camera 10. From this position, if the LCD monitor unit 25 is rotated about the axis X1 toward the retracted position to a degree that the LCD portion 32 lies in a plane substantially parallel to the top surface 11c of the camera body 11, the LCD portion 32 becomes suitable as a waist-level monitor. Additionally, from this position, if the LCD monitor unit 25 is further rotated about the axis X1 to the rear end surface 11b, the LCD portion 32 faces toward the rear of the digital camera 10 as shown in FIG. 9, not facing the rear end surface 11b. In this position shown in FIG. 9, the LCD portion 32 can be viewed without the LCD monitor unit 25 projecting (standing up) from the camera body 11. Although the vertical position of the LCD portion 32 is reversed if the LCD monitor unit 25 is rotated from the position shown in FIG. 8 to the position shown in FIG. 9, or from the position shown in FIG. 9 to the position shown in FIG. 8, the digital camera 10 is provided with a detector which detects a variation in orientation of the LCD monitor unit 25 with respect to the camera body 11, and a display image controller so that the LCD portion 32 displays an image in an upright position when viewed by the user. When the digital camera 10 is carried, it is desirable that the LCD monitor unit 25 be in the retracted position with the LCD portion 32 facing the rear end surface 11b as shown in FIG. 4 to prevent the LCD portion 32 from being damaged.

The digital camera 10 is provided on the right side surface 11e with a grip 40. The grip 40 is formed in a substantially rectangular parallelepiped similar to the camera body 11. The outer surface of the grip 40 includes opposite end surfaces (grip end surfaces) 40a and 40b, and four longitudinal side surfaces 40c, 40d, 40e and 40f which are elongated in a direction orthogonal to both of the grip end surfaces 40a and 40b. The grip end surfaces 40a and 40b are substantially parallel to each other, the longitudinal side surfaces 40c and 40d are substantially parallel to each other, and the longitudinal side surfaces 40e and 40f are substantially parallel to each other. The grip 40 is provided inside thereof with a battery chamber in which a battery pack 42 (shown by broken lines in FIG. 1) serving as a power source for driving the digital camera 10 is accommodated. The grip 40 is provided thereon with a battery chamber lid 43, an outer surface of which forms a major portion of the grip end surface 40a.

The grip 40 is pivoted (rotatable) on the camera body 11 about a pivot shaft (extendable pivot shaft/pivot shaft mechanism) 41. The pivot shaft 41 connects the grip 40 to the camera body 11 so that the right side surface 11e of the camera body 11 and the longitudinal side surface 40f of the grip 40 are connected to each other via the pivot shaft 41. An axis (axis of rotation) X3 of the pivot shaft 41 is substantially parallel to the axis X1 of the pair of pivot pins 29 of the hinge portion 26. The position of the pivot shaft 41 (the axis X3) is in the vicinity of the grip end surface 40b, thus being eccentrically positioned from a center of the grip 40 with respect to the lengthwise direction of the grip 40. Accordingly, the grip 40 can be rotated about the axis X3 while the free end of the grip 40 on the grip end surface 40a (the battery chamber lid 43) moves along an arc about the axis X3.

Figure 5:
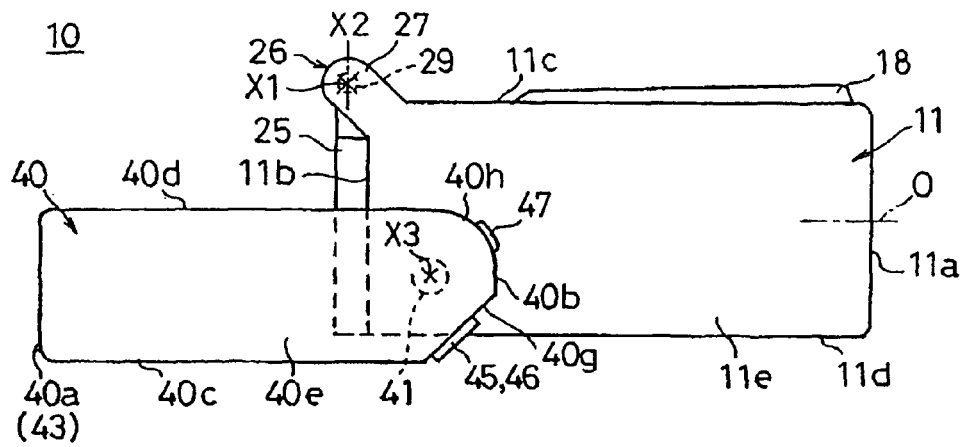
FIG. 5 is a side elevational view of the digital camera shown in FIGS. 1 and 2, showing a state in which the grip is rotated to extend rearwards from the camera body.

FIG. 4 shows a state in which the grip 40 is positioned at one end (retracted position) in the range of rotation of the grip 40, and FIG. 5 shows a state in which the grip 40 is at the other end (rearward-extending position) of the range of rotation of the grip 40. Although the lengthwise direction of the grip 40 is substantially parallel to the lengthwise direction of the camera body 11 at each of the retracted position and the rearward-extending position, the positions of the opposite ends 40a and 40b of the grip are reversed between the grip 40 shown in FIG. 4 and the grip 40 shown in FIG. 5. When the grip 40 is positioned in the retracted end position as shown in FIG. 4, the grip end surface 40a of the grip 40 (the battery chamber lid 43) faces toward the front of the digital camera 10, and the periphery of the grip 40 is enclosed by the periphery of the right side surface 11e as viewed from the right side of the digital camera 10. In other words, in the state shown in FIG. 4, the entire length of the grip 40 in the lengthwise direction thereof (horizontal direction as viewed in FIG. 4) is included within the length of the camera body 11 in the optical axis direction, while the entire width of the grip 40 in a direction orthogonal to the two longitudinal side surfaces 40c and 40d (in the vertical direction as viewed in FIG. 4) is included within the height of the camera body 11 in the vertical direction of the digital camera 10. Therefore, no part of the grip 40 juts outside the periphery of the camera body 11 in either the forward/rearward direction or the vertical direction of the digital camera 10. Accordingly, in the state shown in FIG. 4, the grip 40 and the camera body 11 appear as a single box unit, so that the digital camera 10 is easy to carry. Moreover, in the state shown in FIG. 4, the digital camera 10 can be placed on a floor or a desk stably because the grip 40 does not project downwards. Accordingly, the digital camera 10 is suitable for taking pictures with the camera body placed on such a flat location without the use of a tripod. When the grip 40 is in the retracted position as shown in FIG. 4, the longitudinal side surface 40d of the grip 40 (the bottom surface of the grip 40 as viewed in FIG. 4) is substantially flush with the bottom surface 11d of the camera body 11 (see FIGS. 3 and 11). This structure improves the stability of the digital camera 10 in the case where the digital camera 10 is placed on a flat location such as a floor or a desk with the bottom surface 11d facing downwards.

During a photographing operation, the grip 40 is rotated clockwise from the retracted position as viewed in FIG. 4 by the user's hand so that the user can thereafter hold the digital camera 10 by holding the grip 40. The pivot shaft 41 is provided with a frictional mechanism by which the grip 40 can be stopped at various angular positions between the retracted position (the position shown in FIG. 4) and the rearward-extending position (the position shown in FIG. 5). According to this frictional mechanism, the angular position of the grip 40 relative to the camera body 10 can be freely selected by the user. The angular position of the LCD monitor unit 25 with respect to the camera body 11 can be freely adjusted by rotating the LCD monitor unit 25 about the axis X1 or on the axis X2 as described above. By rotating the grip 40 about the axis X3 for adjustment, independently of the above described positional adjustment of the LCD monitor unit 25, a high degree of flexibility in photographing posture can be achieved. Specifically, the structure wherein the axis of rotation (the axis X1) of the LCD monitor unit 25 and the axis of rotation (the axis X3) of the grip 40 are parallel to each other and extend in the lateral direction (horizontal direction as viewed in FIG. 3) of the digital camera 10 makes it possible to change both the vertical position and the vertical angle of the digital camera 10 at will without loss of the ability of the digital camera 10 to be held by hand and without loss of the viewability of the LCD portion 32.

Figure 11:
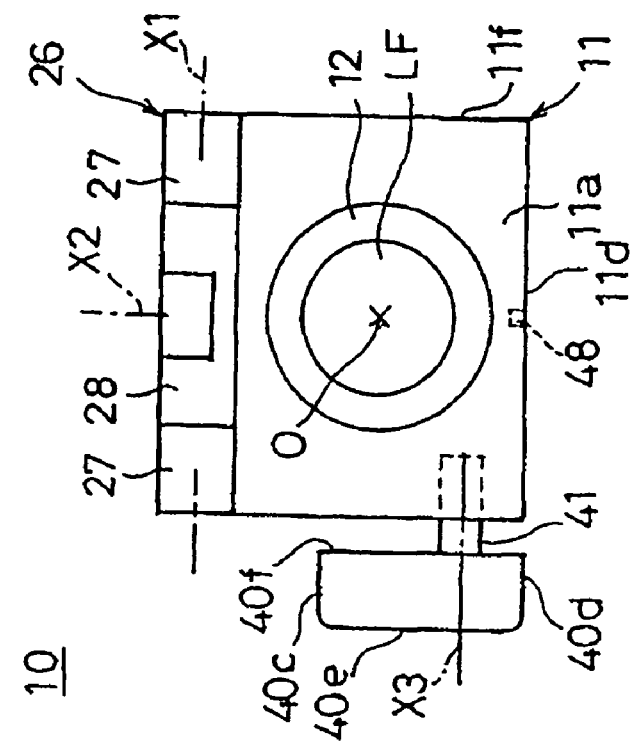
FIG. 11 is a front elevational view of the digital camera shown in FIGS. 1 and 2, showing a state in which the grip is positioned closely to the camera body.
Figure 12:
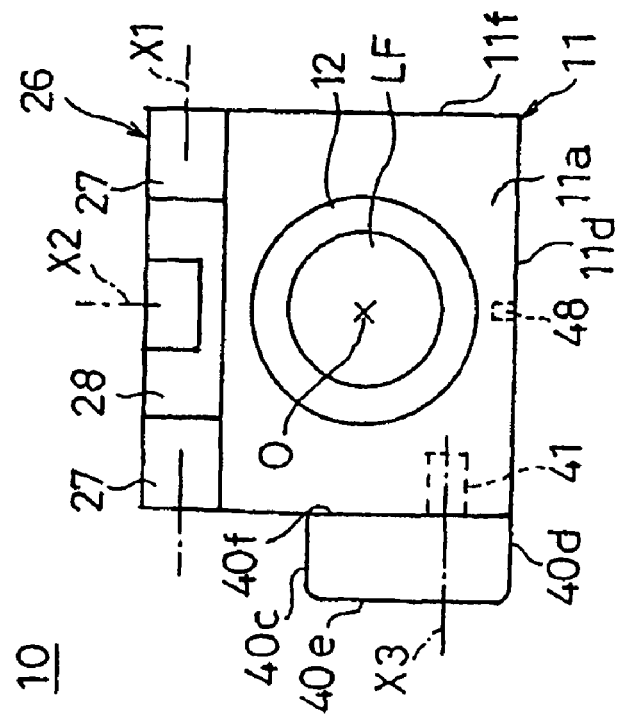
FIG. 12 is a front elevational view of the digital camera shown in FIGS. 1 and 2, showing a state in which the grip is in an extended positioned from the camera body.

The pivot shaft 41 is constructed to allow the grip 40 to be positioned on and jutted away from the right side surface 11e of the camera body 11 in a direction along the axis X3 (the lateral direction of the digital camera 10) as shown in FIGS. 11 and 12. This operation of positioning the grip 40 on and jutted away from the right side surface 11e of the camera body 11 can be performed independently of the above described operation of rotating the grip 40 about the axis X3. For instance, the digital camera 10 can be made compact with the grip 40 jutting from the periphery of the camera body 11 by a minimum amount by positioning the grip 40 close to the camera body 11 when the grip 40 is positioned in the retracted position (the position shown in FIG. 4) as shown in FIG. 11. On the other hand, during a photographing operation, wherein the user holds the grip 40, the camera body 11 (specifically the right side surface 11e thereof) and the user's hand which holds the grip 40 are prevented from interfering with each other by pulling the grip 40 outward (leftward as viewed in FIG. 11) to position where the grip 40 juts away from the camera body 11 by a predetermined distance as shown in FIG. 12, which improves the ability of the grip 40 to be held by hand. Although FIG. 12 shows a state in which the lengthwise direction of the grip 40 is substantially parallel to the lengthwise direction of the camera body 11, from this state the grip 40 can be rotated about the axis X3 to be freely set at any angular position relative to the camera body 11.

As described above, the grip 40 is formed in a substantially box shape (rectangular parallelepiped), and the outer surface of the grip 40 is provided with three pairs of flat surfaces (the two grip end surfaces 40a and 40b, the two longitudinal side surfaces 40c and 40d, and the two longitudinal side surfaces 40e and 40f). The outer surface of the grip 40 is further provided in the vicinity of the grip end surface 40b with an inclined surface 40g which connects the grip end surface 40b with the longitudinal side surface 40c, and a curved surface 40h which constitutes a chamfered portion of the grip end surface 40b at the portion thereof which extends to the longitudinal side surface 40d. The inclined surface 40g, the grip end surfaces 40a and 40b, the curved surface 40h and the longitudinal side surfaces 40c and 40d constitute a surrounding surface which is substantially parallel to the axis X3 and surrounds the axis X3. The inclined surface 40g is formed as a surface non-parallel to any other external surface of the grip 40. The grip 40 is provided on the inclined surface 40g with a release button 45 and a ring-shaped zoom switch 46 which surrounds the release button 45. The curved surface 40h of the grip end surface 40b is formed to have an external positive curvature. The grip 40 is provided on the curved surface 40h with a moving-image recording button 47. The release button 45 serves as a manual operational member for photographing still images. A photometry operation and a distance measuring operation are carried out when the release button 45 is depressed halfway down, and a shutter is released when the release button 45 is fully depressed. A photographing mode and other settings are set with the above described various manual operational members as appropriate. On the other hand, the moving-image recording button 47 serves as a manual operational member for recording moving images. An operation of recording moving images commences immediately after the moving-image recording button 47 is depressed once, and thereafter stops immediately after the moving-image recording button 47 is depressed once again. The still images and moving images are processed via an image processor to be stored in a memory card as electronic image data.

Figure 6:
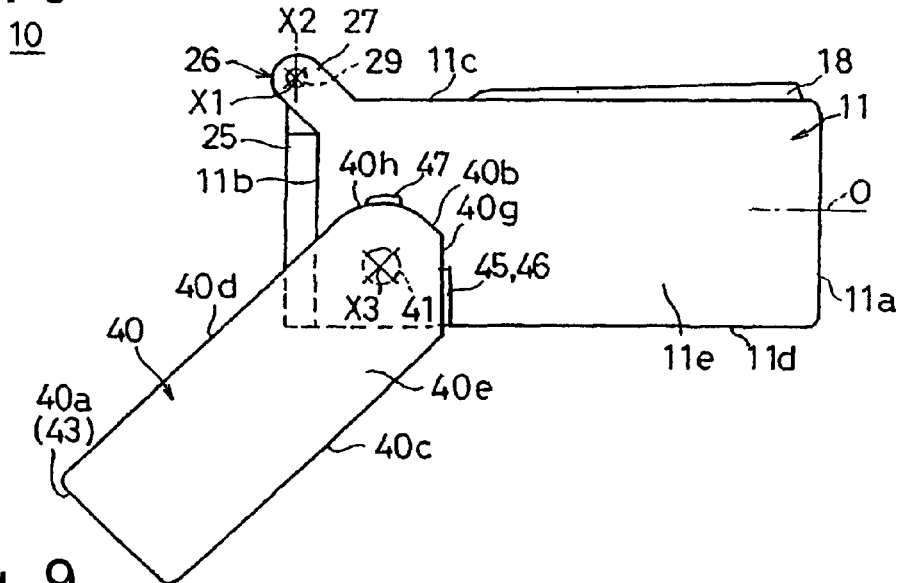
FIG. 6 is a side elevational view of the digital camera shown in FIGS. 1 and 2, showing a state in which the grip is rotated to extend obliquely downwards from the camera body.

As shown in FIG. 4, the inclined surface 40g is formed on the camera body 11 so as to be neither parallel nor orthogonal to a straight line S which extends in a lengthwise direction of the grip 40 between the longitudinal side surfaces 40c and 40d. It is desirable that an angle of inclination K1 of the inclined surface 40g relative to the straight line S be set at an angle between 15 to 75 degrees, more desirably between 30 to 60 degrees. The release button 45 on the inclined surface 40g faces toward the front of the digital camera 10 when the grip 40 is positioned so that the grip end surface 40a (the battery chamber lid 43) faces obliquely rearward and in a downward direction as shown in FIG. 6. In an ordinary photographing posture in which the user holds the digital camera 10 at eye-level or in the vicinity thereof, it is assumed that the grip 40 is positioned within a angular range thereof with the angle of the grip 40 shown in FIG. 6 at a central angle of the angular range. Considering the shape of a human hand, the release button 45 can be easily operated by an index finger (forefinger) if the grip 40 extends obliquely rearward, in a downward direction so that the release button 45 faces substantially toward the front of the digital camera 10 as shown in FIG. 6.

When the grip 40 is in the angular position shown in FIG. 6, the moving-image recording button 47 faces a substantially upward direction of the digital camera 10 so that the position of the moving-image recording button 47 naturally corresponds to the position of the thumb of the user's hand (right hand in the present embodiment of the digital camera) which holds the grip 40 when the index finger is put on the release button 45, due to the moving-image recording button 47 being provided on the grip end surface 40b that is adjacent to the inclined surface 40g and non-orthogonal to the inclined surface 40g. The moving-image recording button 47 is positioned on the curved surface 40h, which is chamfered so as to have an external positive curvature, and also the moving-image recording button 47 projects obliquely outwards in an inclination direction substantially opposite (symmetrical) to the axis of the release button 45 with respect to the straight line S (which extends in a lengthwise direction of the grip 40 between the longitudinal side surfaces 40c and 40d, as shown in FIG. 4). With this positional relationship between the moving-image recording button 47 and the release button 45, in which the pressing direction of the moving-image recording button 47 is inclined with respect to the pressing direction of the release button 45, the thumb of the user's hand (right hand in the present embodiment of the digital camera) holding the grip 40 can be put on the moving-image recording button 47 more naturally, which further improves the operability of the digital camera 10. It is desirable that an: angle of inclination K2 of the moving-image recording button 47 relative to the straight line S be set at an angle substantially equal to the angle K1 of the inclined surface 40g (i.e., an angle of the release button 45 relative to the straight line S).

Accordingly, when the grip 40 is in the angular position shown in FIG. 6, in which the grip 40 is orientated to extend obliquely downwards, or in an angular position in the vicinity thereof, the release button 45 substantially faces an upward direction of the digital camera 10, the moving-image recording button 47 substantially faces a frontward direction of the digital camera 10, and the position of the moving-image recording button 47 naturally corresponds to the position of the thumb of the user's hand when the user holds the grip 40 with the index finger placed on the release button 45. Namely, the release button 45 and the moving-image recording button 47 are disposed on the grip 40 at positions so as to allow the user to operate the release button 45 and the moving-image recording button 47 easily and naturally when the grip 40 is rotated to be set in an operating position (ready-to-photograph position) as shown in FIG. 6.

The angle of the grip 40 relative to the camera body 11 in a ready-to-photograph state is not limited solely to those shown in FIGS. 5 and 6. For instance, when the user takes still or moving images while holding the digital camera 10 above their head, the grip 40 may be positioned at a substantially right-angle relative to the camera body 11 so that the grip end surface 40a (the battery chamber lid 43) faces vertically downwards. In this case, it is conceivable that the user holds the grip 40 with their hand while straightening the arm vertically upwards so that the arm extends in a direction substantially parallel to the lengthwise direction of the grip 40, and accordingly, the index finger and the thumb of the hand holding the grip 40 can be naturally placed on the release button 45 and the moving-image recording button 47, respectively, similar to the case shown in FIG. 6, which allows the user to operate the release button 45 and the moving-image recording button 47 comfortably.

The grip 40 is supported on the pivot shaft 41 at a position on the grip 40 which is eccentric to a center of the grip 40 in the lengthwise direction thereof to be positioned in the vicinity of the grip end surface 40b, and the release button 45 and the moving-image recording button 47 are disposed at positions on the grip 40 in radially outward directions from the pivot shaft 41 (the axis X3) in the relatively close vicinity of the pivot shaft 41. Accordingly, the positions of the release button 45 and the moving-image recording button 47 are not displaced largely with respect to the camera body 11 when the grip 40 is rotated relative to the camera body 11, which does not easily deteriorate the operability of each of the release button 45 and the moving-image recording button 47. Additionally, the release button 45 and the moving-image recording button 47 are positioned substantially on an imaginary cylindrical surface about the pivot shaft 41 (the axis X3), so that neither the distance from the pivot shaft 41 to the release button 45 nor the distance from pivot shaft 41 to the moving-image recording button 47 changes even if the grip 40 is rotated. This arrangement also facilitates the operability of the release button 45 and the moving-image recording button 47.

As can be understood from the above description, the positions of the release button 45 and the moving-image recording button 47 are determined so that the user can easily operate the release button 45 and the moving-image recording button 47 regardless of the angle of the grip 40 relative to the camera body 11.

The camera body 11 is provided on the bottom surface 11d with a tripod socket (female screw hole) 48 which is open downwards from the camera body 10 (see FIG. 4). Since the LCD monitor unit 25 and the grip 40 are supported on the rear end surface 11b and the right side surface 11e, respectively, neither the LCD monitor unit 25 nor the grip 40 overlap the bottom surface 11d of the camera body 11 even if rotated. Therefore, the tripod socket 48 is never covered by either of the LCD monitor unit 25 or the grip 40. Accordingly, even though the digital camera 10 is provided on the camera body with two independent rotatable members: the grip 40 and the LCD monitor unit 25, a photographing operation using a tripod can be carried out regardless of the of the positions of the LCD monitor unit 25 and the grip 40. Moreover, the digital camera 10 can be stably put on a floor or the like without the use of a tripod if the grip 40 is rotated to the retracted position. Namely, the digital camera 10 can be used not only in an ordinary situation in which the user takes still or moving images while holding the digital camera 10 with their hand but also in other photographing positions.

In a photographing operation, with the user holding the digital camera 10, it is generally the case that the user holds the digital camera 10 with their right hand gripping the grip 40 and with their left hand holding the camera body 11. Furthermore, it is normally the case that the palm of the left hand supports the camera body 11 from the bottom surface 11d while the thumb of the left hand is laid on the left side surface 11f, and accordingly, there is little possibility of performing an unintentional operation due to no manual operational members being provided on the bottom surface 11d. The bottom surface 11d comes in contact with the left hand by an area larger than any other external surface portions of the digital camera 10. Moreover, the photographing mode and other settings can be set without changing the user's photographing posture because the manual operational members which are frequently used during photographing, such as the flash mode select button 20, the continuous shot mode select button 21 and the focus mode select button 22, are positioned on the left side surface 11f, on which the thumb of the left hand is placed.

During playback of recorded still and/or moving images on the LCD portion 32, it is assumed that the user holds the digital camera 10 with the fingers placed on the upper surface 11c of the camera body 11. Accordingly, manual operational members used for playback images are positioned on the top surface 11c, so that the user can easily operate these manual operational members without changing the above described photographing posture. During playback of recorded still and/or moving images, the user can hold the digital camera 10 with both hands holding the camera body 11 with the grip 40 positioned in the retracted position.

FIGS. 13 through 16 show the internal circuitry of the camera body 11, viewed from different angles. The digital camera 10 is provided in the camera body 11 with a hollow-cylindrical holder 50 which holds and accommodates the photographing optical system of the digital camera 10. The holder 50 holds the photographing optical system so that the axis of the holder 50 extends in the optical axis direction. The holder 50 is provided at the front end thereof with an aperture 50a (see FIG. 13) for holding the front most lens group LF therein. The digital camera 10 is provided in the camera body 11 with a CCD image sensor 51 mounted to a CCD fixing plate 52. The CCD image sensor 51 is fixed at the rear end of the holder 50 via the CCD fixing plate 52. Although the holder 50, that serves as a holding member for holding the photographing optical system, is formed as a single member for the purpose of making the location of the photographing optical system easier to recognize, the holding member does not have to be formed as a single member like the holder 50.

The CCD image sensor 51 and other optical elements such as the front most lens group LF are elements of the photographing optical system of the digital camera 10. The CCD fixing plate 52 is positioned between the rear end of the holder 50 and the rear end surface 11b of the camera body 11 to lie in a plane substantially orthogonal to the optical axis O. In addition to the CCD fixing plate 52, the digital camera 10 is provided in the camera body 11 with a first switch substrate 53, a second switch substrate 54, a jack substrate 55 and a main substrate 58. The first switch substrate 53 is formed as a flat board, and is positioned between the holder 50 and the top surface 11c of the camera body 11 to be substantially parallel to the top surface 11c. The power button 13, the mode select dial 14, the playback button 15, the menu button 16 and the multi-direction button 17 are mounted to the first switch substrate 53. The second switch substrate 54 is formed as a flat board, and is positioned between the holder 50 and the left side surface 11f of the camera body 11 to be substantially parallel to the left side surface 11f. The flash mode select button 20, the drive mode select button 21 and the focus mode select button 22 are mounted to the second switch substrate 54. The jack substrate 55 is formed as a flat board, and is positioned between the holder 50 and the bottom surface 11d of the camera body 11 to be substantially parallel to the bottom surface 11d. A PC jack 56 for connection to a personal computer and an adapter jack 57 for power adapter (e.g., AC adapter) are mounted to the jack substrate 55. The PC jack 56 and the adapter jack 57 are positioned on the left side surface 11f to be accessible from the outside of the camera body 11 if the external connector cover 24 is opened. The main substrate 58 is formed as a flat board, and is positioned between the holder 50 and the right side surface 11e of the camera body 11 to be substantially parallel to the right side surface 11e. Various components such as a microcomputer for controlling the overall operation of the digital camera 10 and a circuit for processing image data are mounted to the main substrate 58. The main substrate 58 is greater in length than the first switch substrate 53, the second switch 54 and the jack substrate 55 in the optical axis direction (forward/rearward direction of the digital camera 10). The CCD fixing plate 52 and the first switch substrate 53 are connected to the main substrate 58 via a flexible PWB (printed-wiring board) 59a and a flexible PWB 59b, respectively. The second switch substrate 54 is connected to the first switch substrate 53 via a flexible PWB 59c to send signals to the main substrate 58 via the first switch substrate 53. The jack substrate 55 is connected to the main substrate 58 via a connector 55a.

As can be seen from FIGS. 13 through 16, the photographing optical system (the holder 50) of the digital camera 10 is positioned in an internal space thereof which is surrounded by a circuit board consisting of the CCD fixing plate 52, the first switch substrate 53, the jack substrate 55 and the main substrate 58. Specifically, the photographing optical system that is provided in the present embodiment of the digital camera is an internal-focusing/zooming optical system, in which the focus or the focal length is altered by moving elements internally within the lens barrel as mentioned above, and accordingly, no portion of the photographing optical system projects forward from the front of the camera body 11, and therefore remains within the camera body 11 at all times. Additionally, the CCD fixing plate 52, the first switch substrate 53, the jack substrate 55 and the main substrate 58 are positioned in the camera body 11 to surround the photographing optical system. This circuit arrangement saves space for electrical components in the camera body 11, thus contributing to improvement in degree of freedom in miniaturization and design of the digital camera 10. The camera body 11 is formed as a substantially rectangular parallelepiped which is elongated along the optical axis O specifically in the illustrated embodiment of the digital camera as mentioned above, and this shape of the camera body 11 is advantageous for installing the first switch substrate 53, the second switch substrate 54, the jack substrate 55 and the main substrate 58 along an inner surface of the camera body 11 which extends in the lengthwise direction of the camera body 11.

In the present embodiment of the digital camera, the rotatable grip 40 is mounted to the right side surface 11e of the camera body 11. It is desirable that no elements such as operational switches or terminals (jacks) be provided on a surface of the camera body to which a rotatable member such as the grip 40 is mounted in order to prevent the rotatable member from interfering with such elements. Accordingly, the first switch substrate 53 and the second switch substrate 54, which include switch contacts, and the jack substrate 55, which includes electrical terminals, are installed along three inner surfaces of the camera body 11 which correspond to the top surface 11c, the bottom surface 11d and the left side surface 11f, respectively, and no substrate is installed along an inner surface of the camera body 11 which corresponds to the right side surface 11e. By 15 taking advantage of this structure in which no elements such as switches or terminals are installed (cannot be installed) to the right side surface 11e of the camera body 11, the main substrate 58, which does not have to be connected to any external parts or devices, is installed in the immediate area of the inner surface of the camera body 11 which corresponds to the right side surface 11e. As can be seen from FIGS. 14 and 15, the internal space of the camera body 11 on the right side surface 11e is exclusively assigned to the installation of the main substrate 58, which makes it possible to adopt the large main substrate 58 that is shaped to have a length close to the length of the holder 50 in the optical axis direction.

Likewise, no elements such as switches or terminals are installed on the rear end surface 11b of the camera body 11, which supports the movable LCD monitor unit 25 (a movable member like the grip 40), while the CCD fixing plate 52, which does not have to be connected to any external parts or devices similar to the main substrate 58, is installed in the immediate area of an inner surface of the camera body 11 which corresponds to the rear end surface 11b. In terms of the efficiency of saving space and simplifying the circuitry, it is desirable that the CCD fixing plate 52, on which the CCD image sensor 51 is mounted, be positioned in the internal space of the camera body 11 in the vicinity of the rear end surface 11b since the internal space of the camera body 11 in the vicinity of the rear end surface 11b is adjacent to the rear end of the photographing optical system.

As can be understood from the above descriptions, in the above illustrated embodiment of the digital camera, a high degree of flexibility in photographing posture and an improvement in operability of the digital camera 10 are achieved by designing the LCD monitor unit 25 and the grip 40 to be rotatable independently of each other. In addition, the release button 45 and the moving-image recording button 47 are easy to operate regardless of the rotational position (angular position) of the grip 40.

Figure 17:
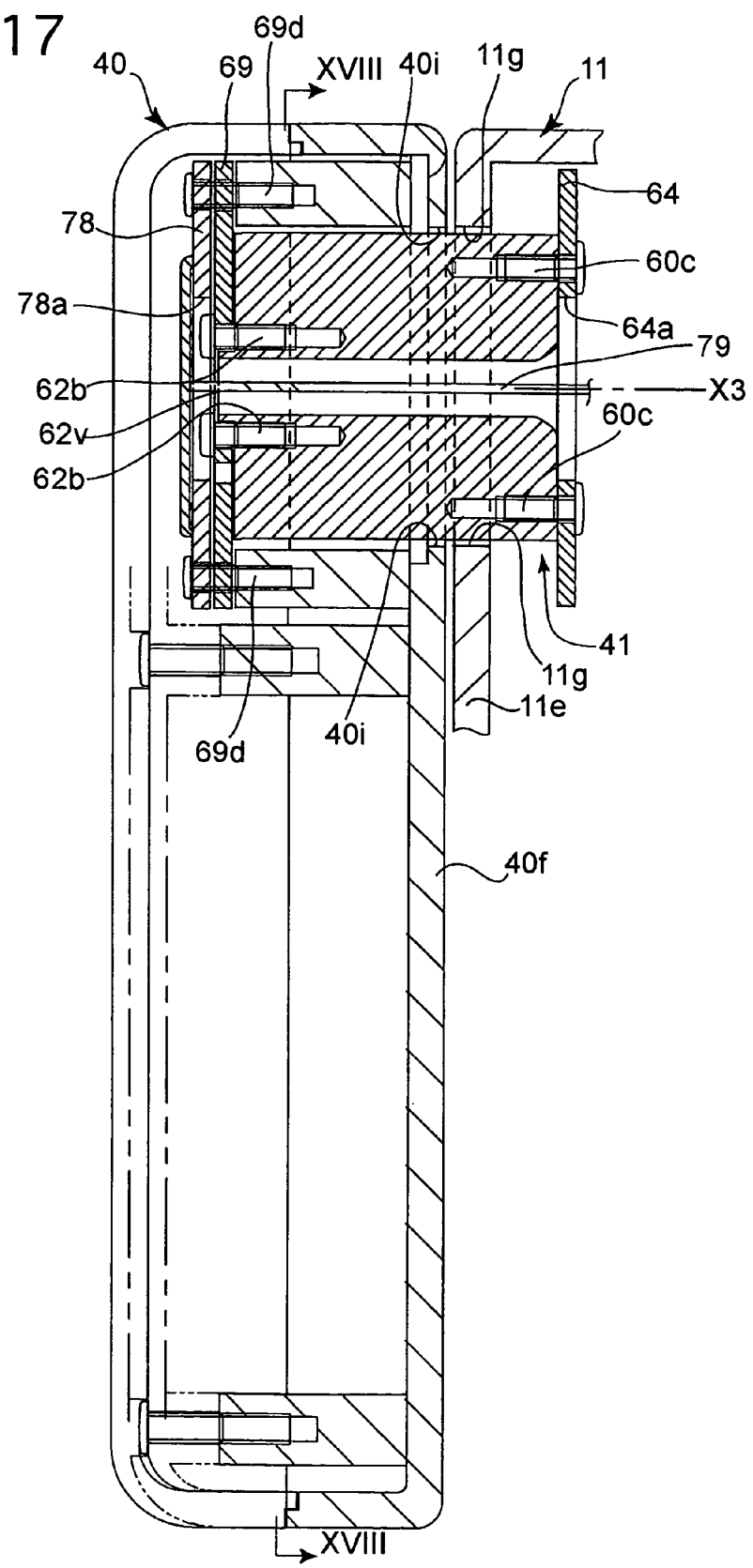
FIG. 17 is a cross sectional view of the grip of the digital camera shown in FIGS. 1 and 2, taken along a plane which includes the axis of an extendable pivot shaft mechanism of the grip and the axis of the grip in the lengthwise direction thereof.
Figure 18:
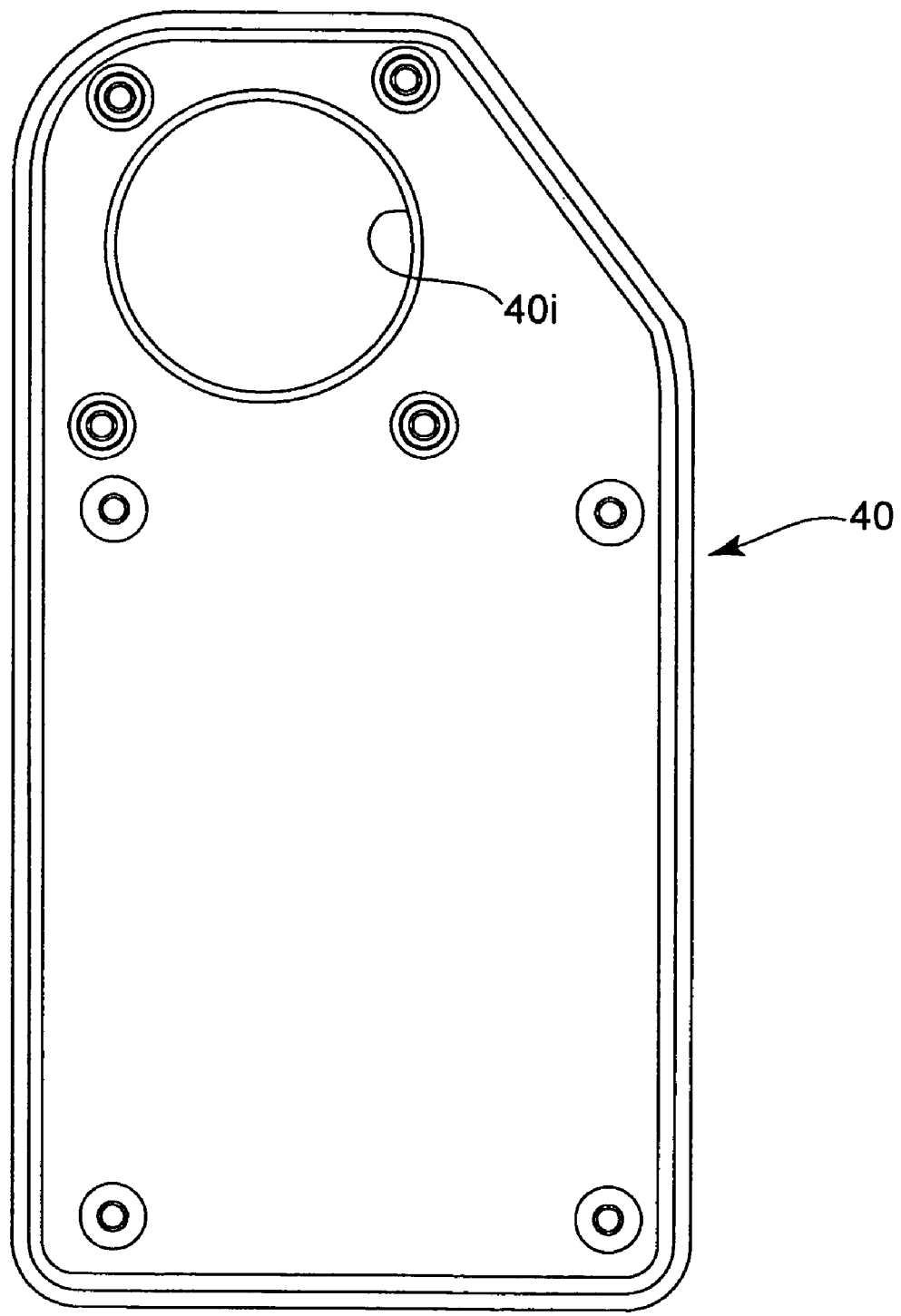
FIG. 18 is a cross sectional view of a grip external member, taken along XVIII-XVIII line in FIG. 17.

The structure of the pivot shaft 41 will be hereinafter discussed in detail with reference to FIGS. 17 through 38. As shown in FIGS. 17 and 18, the right side surface 11e of the camera body 11 and the longitudinal-side surface 40f of the grip 40 which face each other are provided with a pivot shaft insertion hole 11g and a pivot shaft insertion hole 40i, respectively, which are aligned in the direction of the pivot shaft 41 (the axis X3). The digital camera 10 is provided in the grip 40 with a grip-side pivot support plate (pivot support member) 69 which is fixed to an internal stationary portion of the grip 40, and is provided in the camera body 11 with a body-side pivot support plate (pivot support member) 64 which is fixed to the camera body 11 so that the pivot shaft insertion holes 11g and 40i are positioned between the body-side pivot support plate 64 and the grip-side pivot support plate 69. The pivot shaft 41 passes through the pivot shaft insertion holes 11g and 40i so that the opposite ends of the pivot shaft 41 are supported by the grip-side pivot support plate 69 and the body-side pivot support plate 64, respectively.

Figure 19:
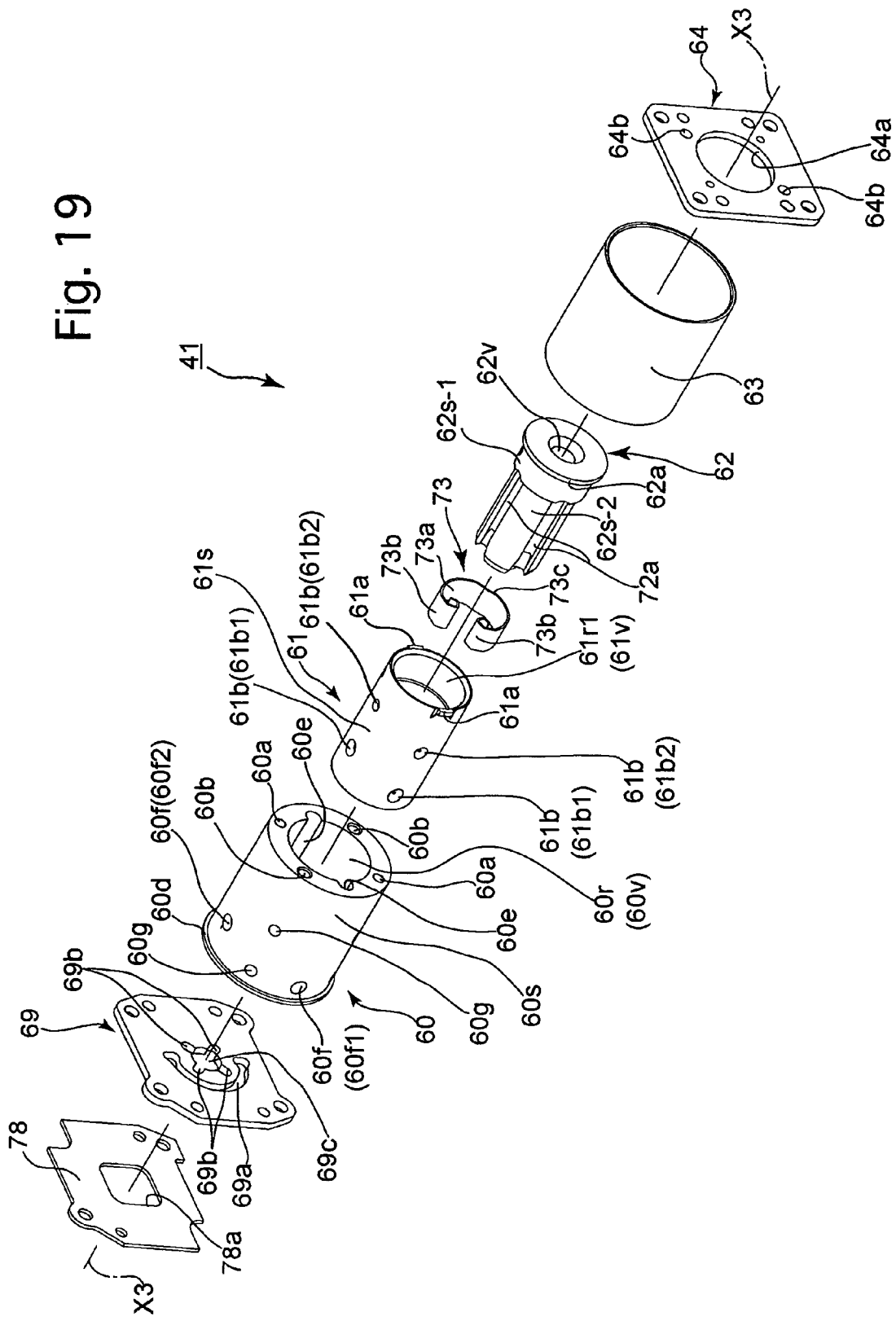
FIG. 19 is an exploded perspective view of the pivot shaft mechanism, showing elements thereof.
Figure 20:
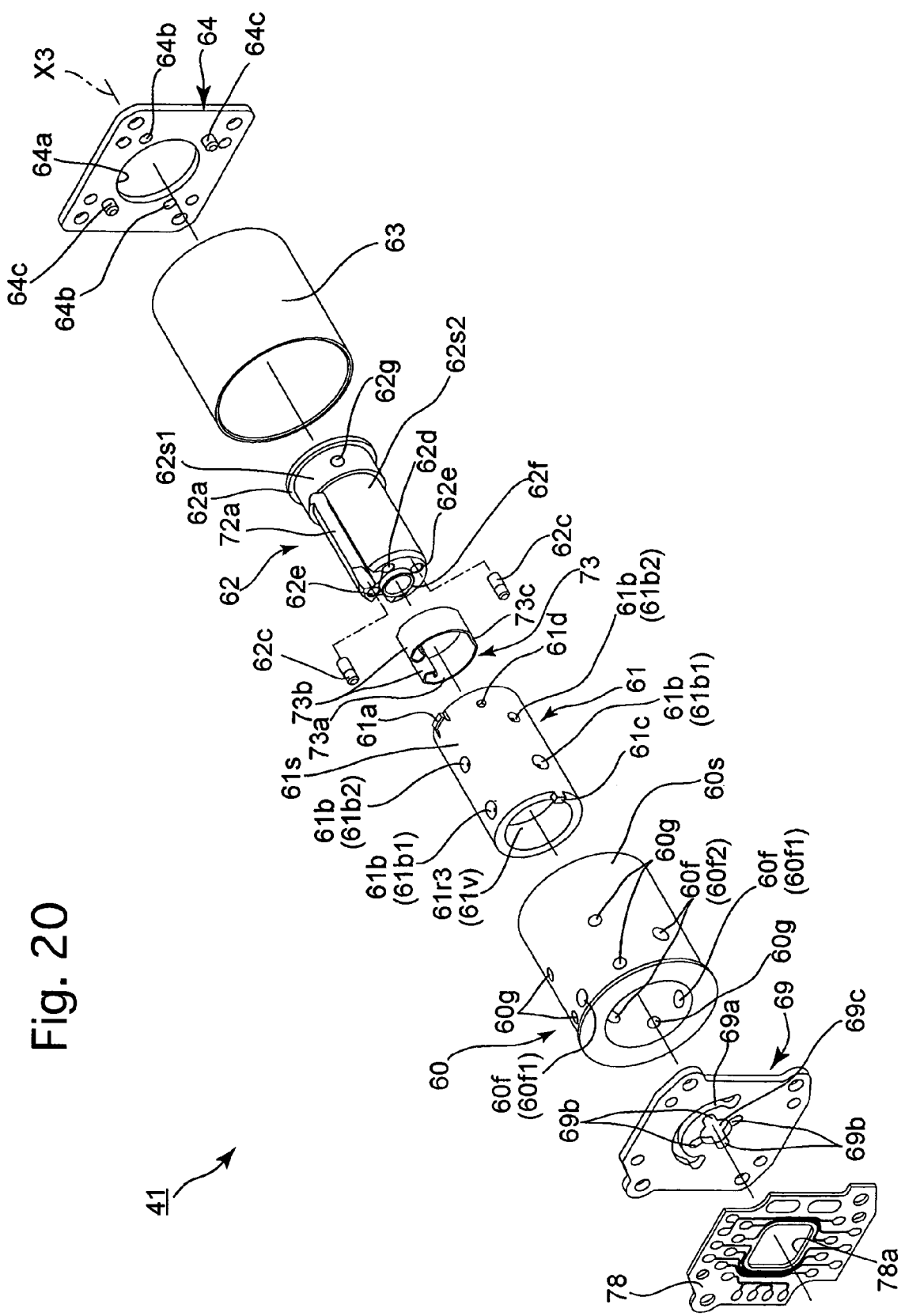
FIG. 20 is an exploded perspective view of the pivot shaft mechanism, viewed from a different angle.

As shown in FIGS. 19 and 20, the body-side pivot support plate 64 is provided at a substantially center thereof with a central circular through-hole 64a, and is provided around the central circular through-hole 64a with a pair of through-holes 64b and a pair of positioning pins 64c. The pair of through-holes 64b are positioned to be symmetrical with respect to the axis X3 of the pivot shaft 41. Likewise, the pair of positioning pins 64c are positioned to be symmetrical with respect to the axis X3 of the pivot shaft 41. The grip-side pivot support plate 69 that is positioned on the grip 40's side is provided with a rotational angle limit groove 69a having the shape of an arc about the axis X3, four through-holes 69b positioned at substantially equally-angular intervals on a circle about the axis X3, and a central circular through-hole 69c having the center thereof on the axis X3. The grip-side pivot support plate 69 is positioned in the grip 40 to be fixed thereto by set screws 69d as shown in FIG. 17.

The pivot shaft 41 is three-layered, i.e., includes an outer cylinder (linearly movable shaft element/body-side cylindrical shaft member) 60, a middle cylinder (middle cylindrical shaft member) 61 and an inner cylinder (inner shaft/rotatable shaft element/grip-side cylindrical shaft member) 62, which are mutually different in diameters and are concentrically arranged. An external cylindrical cover 63 is fitted on the outer cylinder 60 to cover an outer peripheral surface 60s of the outer cylinder 60. Note that the outer cylinder 60, the middle cylinder 61 and the inner cylinder 62 are shown as an integral member (by a diagonally shaded area) in FIG. 17 for the purpose of illustration.

Figure 26:
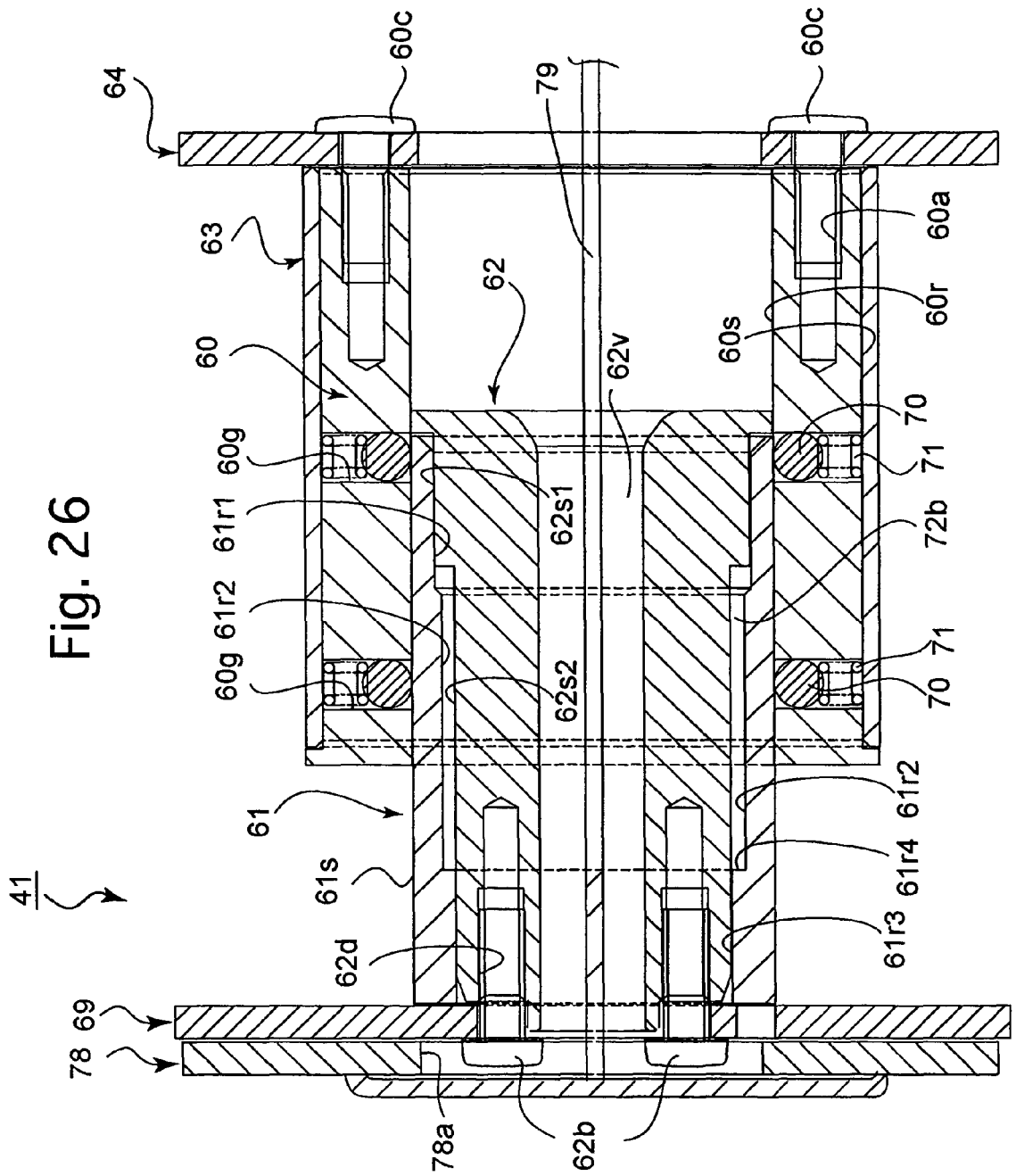
FIG. 26 is a view similar to that of FIG. 24, taken along a plane at another different circumferential position.
Figure 27:
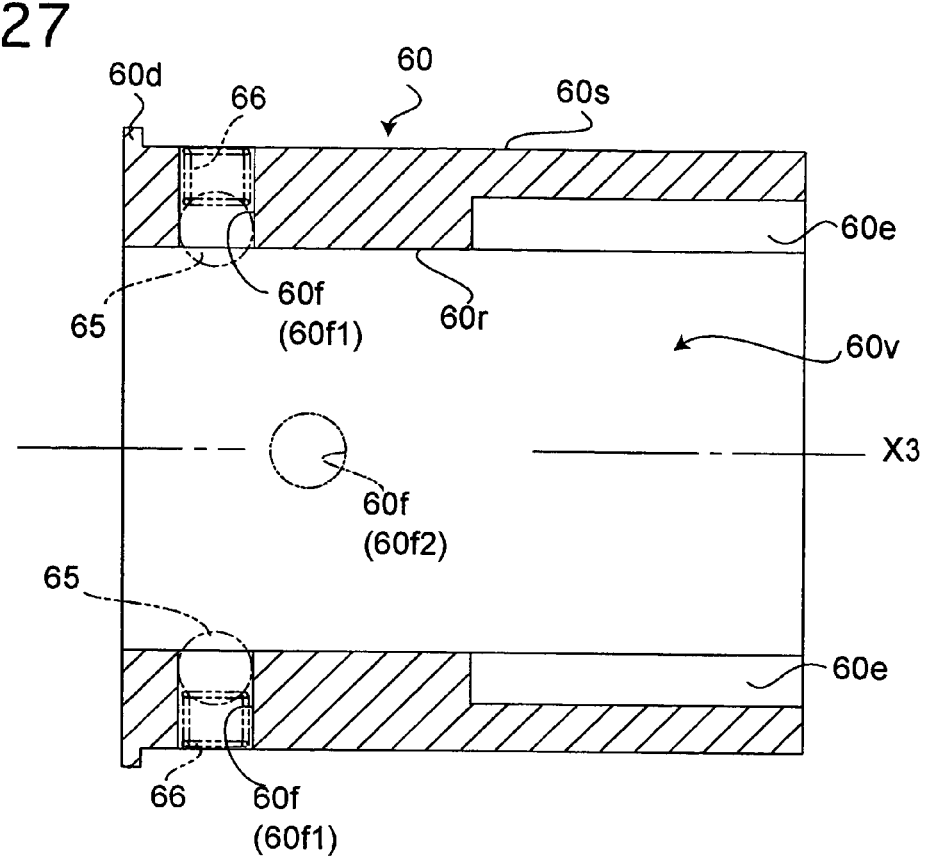
FIG. 27 is an axial cross sectional view of an outer cylinder which serves as an element of the pivot shaft mechanism.
Figure 28:
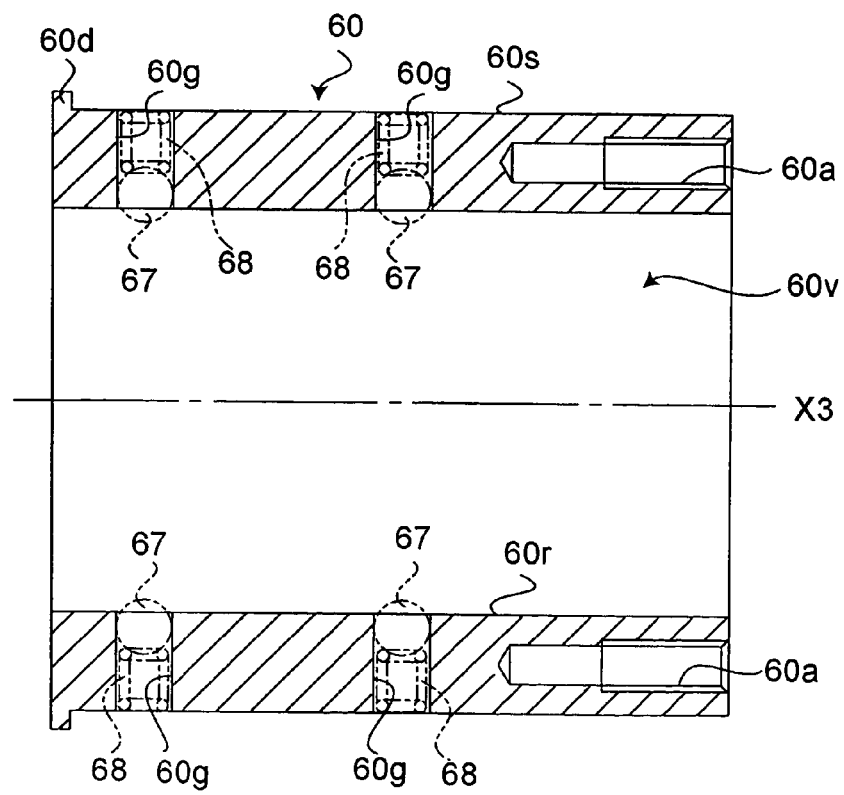
FIG. 28 is a view similar to that of FIG. 27, taken along a plane at a different circumferential position.

As shown in FIGS. 27 and 28, the outer cylinder 60 is a hollow cylindrical member having a through space 60v which extends along the axis X3. The outer cylinder 60 is provided, at positions thereon which respectively correspond to the pair of through-holes 64b of the body-side pivot support plate 64, with a pair of screw holes 60a. The outer cylinder 60 is further provided, at positions thereon which respectively correspond to the pair of positioning pins 64c of the body-side pivot support plate 64, with a pair of positioning holes 60b. The outer cylinder 60 is fixed to the body-side pivot support plate 64 by a pair of set screws 60c (see FIGS. 17, 23 and 26) which are screwed into the pair of screw holes 60a through the pair of through-holes 64b, respectively. Thereupon, the pair of positioning pins 64c are engaged in the pair of positioning holes 60b so that the position of the outer cylinder 60 with respect to the body-side pivot support plate 64 is determined. The outer cylinder 60 is provided at the other end (hereinafter referred to as a grip-side end) with a stop flange (outer annular flange) 60d which projects radially outwards. The external cylindrical cover 63, which is fitted on the outer peripheral surface 60s of the outer cylinder 60 to be supported thereby, is sandwiched between the stop flange 60d and the body-side pivot support plate 64 to be prevented from moving in the direction of the axis X3 relative to the outer cylinder 60.

The outer cylinder 60 is provided with a cylindrical inner peripheral surface 60r, the axis thereof being common with the axis X3. The outer cylinder 60 is provided on the cylindrical inner peripheral surface 60r with a pair of linear guide grooves (linear grooves) 60e which extend parallel to the axis X3, four click-ball accommodation holes (an element of a first click-stop mechanism) 60f and eight guide ball accommodation holes 60g. The pair of linear guide grooves 60e are positioned to be symmetrical with respect to the axis X3. The four click-ball accommodation holes 60f are positioned at substantially equally-angular intervals in a circumferential direction of the outer cylinder 60. A pair of click-ball accommodation holes 60f (60f1) among the four click-ball accommodation holes 60f which radially face each other and the remaining pair of click-ball accommodation holes 60f (60f2) which radially face each other are provided at different positions in the direction of the axis X3. A click ball (an element of a first click-stop mechanism) 65 is accommodated in each click-ball accommodation hole 60f, and is biased radially inwards by an associated compression coil spring (an element of a first click-stop mechanism) 66. A guide ball 67 is accommodated in each guide ball accommodation hole 60g, and is biased radially inwards by an associated compression coil spring 68. Each of the four click-ball accommodation holes 60f and the eight guide ball accommodation holes 60g is formed as a through-hole which extends in a radial direction of the outer cylinder 60 so that not only the radially inner end of each click-ball accommodation hole 60f and 60g is open on the inner peripheral surface of the outer cylinder 60 but also the radially outer end of each click-ball accommodation hole 60f and 60g is open on the outer peripheral surface 60s of the cylindrical cover 63. Each click ball 65, each compression coil spring 66, each guide ball 67 and each compression coil spring 68 can be installed in the associated click-ball accommodation hole 60f or the associated guide ball accommodation hole 60g from the radially outside of the outer cylinder 60. Upon installation, the radially outer opening of each click-ball accommodation hole 60f and the radially outer opening of each guide ball accommodation hole 60g are closed by fitting the external cylindrical cover 63 on the outer peripheral surface 60s thereof, so that the inner peripheral surface of the external cylindrical cover 63 serves as a support portion for supporting each compression coil spring 66 and 68.

Figure 29:
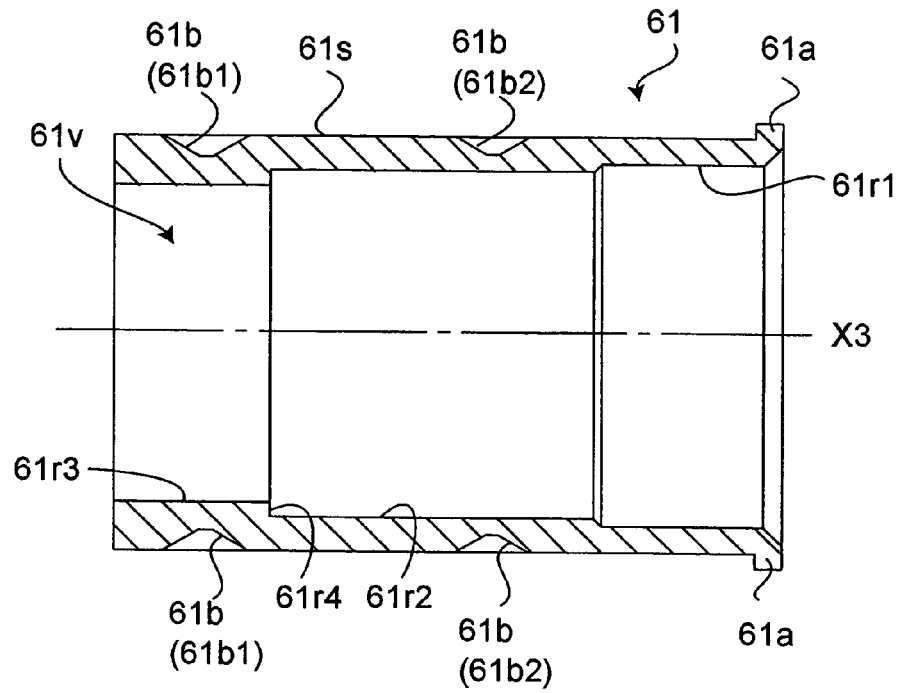
FIG. 29 is an axial cross sectional view of a middle cylinder which serves as an element of the pivot shaft mechanism.
Figure 30:
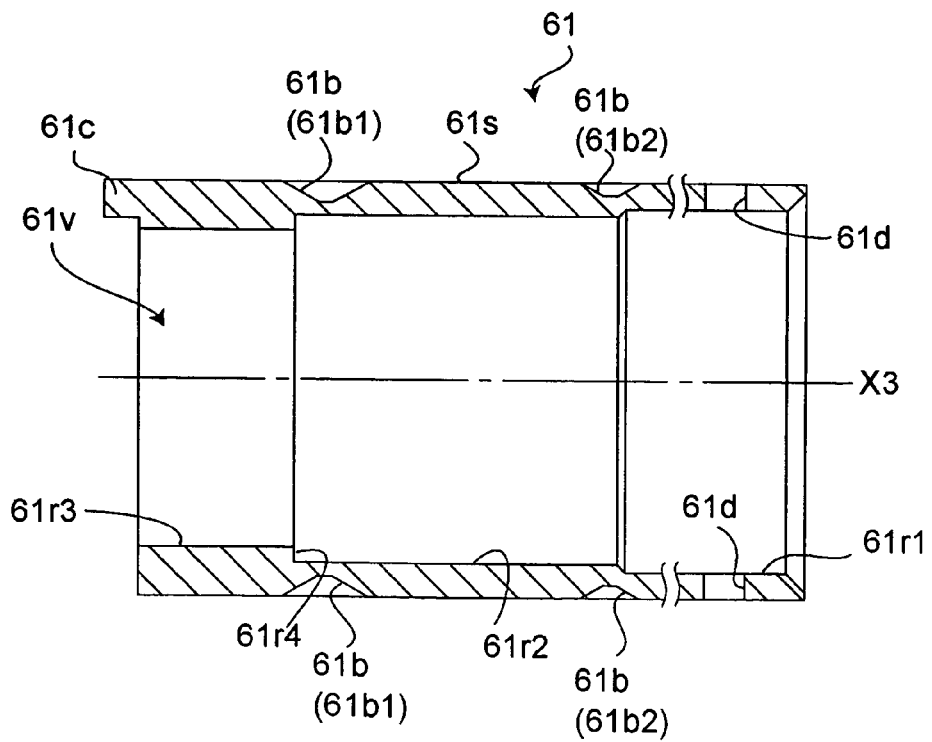
FIG. 30 is a view similar to that of FIG. 29, taken along a plane at a different circumferential position.

The middle cylinder 61 is inserted in the through space 60v of the outer cylinder 60. As shown in FIGS. 29 and 30, the middle cylinder 61 is a hollow cylindrical member having a through space 61v which extends along the axis X3, and is provided with a cylindrical outer peripheral surface 61s which is slidable on the inner peripheral surface 60r of the outer cylinder 60. The middle cylinder 61 is provided, in the vicinity of an end thereof which faces the body-side pivot support plate 64 (hereinafter referred to as a body-side end), with a pair of linear guide projections (radial projections) 61a which project radially outwards from the outer peripheral surface 61s. The middle cylinder 61 is inserted into the outer cylinder 60 with the body-side end of the middle cylinder 61 facing the body-side pivot support plate 64, and the pair of linear guide projections 61a are slidably engaged in the pair of linear guide grooves 60e, respectively (see FIGS. 21, 24 and 38). Due to the engagement of the pair of linear guide projections 61a with the pair of linear guide grooves 60e, the middle cylinder 61 is guided in the direction of the axis X3 with respect to the outer cylinder 60 while being prevented from rotating about the axis X3 relative to the outer cylinder 60. The middle Cylinder 61 is movable relative to the outer cylinder 60 in a direction to project from the camera body 11 (in a direction away from the body-side pivot support plate 64) to a position shown in FIG. 24 in which the pair of linear guide projections 61a are engaged with the bottom ends (left ends as viewed in FIG. 24) of the pair of linear guide grooves 60e.

The middle cylinder 61 is provided on the outer peripheral surface 61s thereof with eight click recesses (elements of the first click-stop mechanism) 61b. The eight click recesses 61b consist of front four click recesses 61b1 formed circumferentially at substantially equally-angular intervals, and rear four click recesses 61b2 formed circumferentially at substantially equally-angular intervals. The front four click recesses 61b1 and the rear four click recesses 61b2 are aligned in the direction of the axis X3, respectively. Namely, if one of the front four click recesses 61b1 and one of the rear four click recesses 61b2 which are aligned in the direction of the axis x3 are regarded as a pair of click recesses, it can be said that there are four pairs of click recesses 61b which are formed on the outer peripheral surface 61s at substantially equally-angular intervals in a circumferential direction of the outer cylinder 61. Among the four pairs of click recesses 61b, two pairs of click recesses 61 (shown in FIG. 29) which are provided on radially opposite sides of the middle cylinder 61 and the remaining two pairs of click recesses 61b (shown in FIG. 30) which are provided on radially opposite sides of the middle cylinder 61 are provided at different positions in the direction of the axis X3. The amount of displacement in the direction of the axis X3 between the two pairs of click recesses 61b shown in FIG. 29 and the two pairs of click recesses 61b shown in FIG. 30 corresponds to the amount of displacement in the direction of the axis x3 between the pair of click-ball accommodation holes 60f1 and the pair of click-ball accommodation holes 60f2. Accordingly, a first state (shown in FIGS. 21 and 22) where the four click balls 65 are simultaneously engaged in the front four click recesses 61b1, respectively, and a second state (shown in FIGS. 24 and 25) where the four click balls 65 are simultaneously engaged in the rear four click recesses 61b2, respectively, can be selectively changed. As can be seen from FIGS. 29 and 30, the four front click recesses 61b1 and the four rear click recesses 61b2 are formed so that each rear click recess 61b2 has a shallower depth than each front click recess 61b1.

The eight click recesses 61b are positioned so as not to overlap the eight guide balls 67, which are respectively accommodated in the eight guide ball accommodation holes 60g of the outer cylinder 60, at all times regardless of variations in the position of the middle cylinder 61 relative to the outer cylinder 60 in the direction of the axis X3. Therefore, each of the eight guide balls 67 is in pressing contact with the outer peripheral surface 61s by a constant biasing force at all times to stabilize the clearance between the outer cylinder and the middle cylinder 61 regardless of the relative position between the middle cylinder 61 and the outer cylinder 60.

Figure 37:
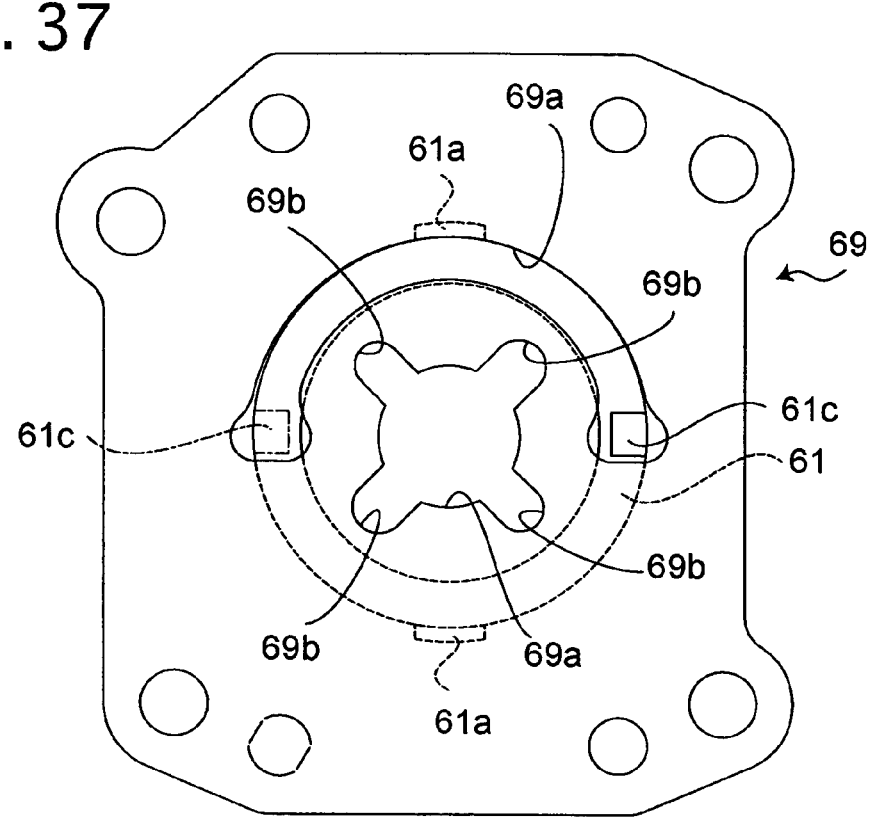
FIG. 37 is a front elevational view of a shaft support plate of the pivot shaft mechanism.
Figure 38:
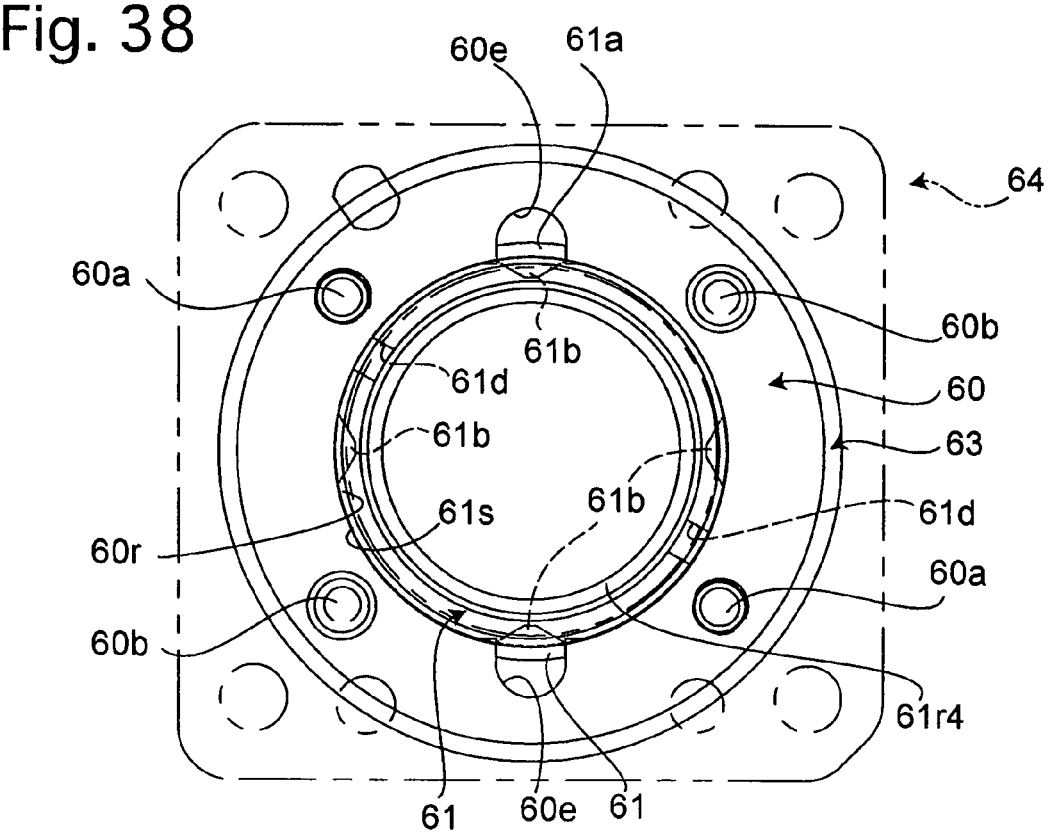
FIG. 38 is an elevational view of the outer cylinder and the middle cylinder, viewed from the camera body side.

The middle cylinder 61 is provided, at one end thereof (hereinafter referred to as a grip-side end) on the opposite side of the middle cylinder 61 from another end of the middle cylinder 61 in the vicinity of which the pair of linear guide projections 61a are formed, with a rotational angle limit projection 61c which is inserted into the rotational angle limit groove 69a of the grip-side pivot support plate 69 (see FIG. 37). The rotational angle limit groove 69a is formed as a through-hole having the shape of an arc about the axis X3 which extends over a range of approximately 180 degrees. The range of rotation of the grip 40 about the axis X3 relative to the camera body 11 is limited to approximately 180 degrees by the engagement of the rotational angle limit projection 61c with the opposite ends of the rotational angle limit groove 69a. The grip-side end of the middle cylinder 61 is in contact with the grip-side pivot support plate 69 on a predetermined area thereon except for the area on which the rotational angle limit groove 69a is formed.

The middle cylinder 61 is provided on an inner peripheral surface thereof with a three-stepped surface having different inner diameters which consists of a large-diameter inner peripheral surface 61r1, an intermediate-diameter inner peripheral surface 61r2 and a small-diameter inner peripheral surface 61r3, in that order from the body-side pivot support plate 64. The middle cylinder 61 is provided on the large-diameter inner peripheral surface 61r1 with a pair of click-ball engaging holes (elements of a second click-stop mechanism) 61d which are positioned to be symmetrical with respect to the axis X3. The pair of click-ball accommodation holes 60f (60f2) and the pair of click-ball engaging holes 61d are shown on the same plane for the purpose of illustration in FIGS. 22 and 25. Namely, the pair of click-ball accommodation holes 60f and the pair of click-ball engaging holes 61d are provided at different circumferential positions.

The inner cylinder 62 is inserted into the through space 61v of the middle cylinder 61. As shown in FIGS. 31 through 35, the inner cylinder 62 is a hollow cylindrical member having a through space 62v which extends along the axis X3. The inner cylinder 62 is provided, at one end thereof on the body-side pivot support plate 64 side (hereinafter referred to as a body-side end), with a stop flange (radial projection) 62a which projects radially outwards. The stop flange 62a is engaged with the body-side end of the middle cylinder 61. On the other hand, the other end (grip-side end) of the inner cylinder 62 is fixed to the grip-side pivot support plate 69 via a pair of set screws 62b and a pair of positioning pins 62c (see FIG. 20). More specifically, the inner cylinder 62 is provided, on an end surface thereof at the grip-side end of the inner cylinder 62, with a pair of screw holes 62d and a pair of rotation limit holes 62e (see FIG. 34), so that the pair of screw holes 62d and the pair of rotation limit holes 62e face the four through-holes 69b in the direction of the axis X3, respectively. Rear halves (right halves as viewed in FIG. 20) of the pair of positioning pins 62c are inserted into the pair of rotation limit holes 62e, respectively, while front halves (left halves as viewed in FIG. 20) of the pair of positioning pins 62c which are smaller in diameter than the rear halves of the pair of positioning pins 62c are inserted into the associated two through-holes 69b for proper positioning of the rear end of the inner cylinder 62 relative to the grip-side pivot support plate 69, and the pair of set screws 62b are screwed into the pair of screw holes 62d through the associated two through-holes 69b from the grip-side pivot support plate 69 side, respectively. In a state where the inner cylinder 62 is fixed to the grip-side pivot support plate 69 in such a manner, the middle cylinder 61 is sandwiched between the grip-side pivot support plate 69 and the stop flange 62a in the direction of the axis X3, so that the middle cylinder 61 and the inner cylinder 62 become integral with each other to be prevented from moving relative to each other in the direction of the axis X3. The inner cylinder 62 is provided at the grip-side end thereof with a cylindrical end portion 62f which forms an opening of the through space 62v on the grip-side end of the inner cylinder 62. The cylindrical end portion 62f is fitted in the central circular through-hole 69c of the grip-side pivot support plate 69 in a state where the inner cylinder 62 is fixed to the grip-side pivot support plate 69. The central circular through-hole 69c and the four through-holes 69b are communicatively connected with each another (see FIG. 37).

Although the inner cylinder 62 and the middle cylinder 61 are not relatively movable in the direction of the axis X3 as mentioned above, the inner cylinder 62 is supported by the middle cylinder 61 therein to be rotatable relative to the middle cylinder 61 about the axis X3. Specifically, the inner cylinder 62 is provided on an outer peripheral surface thereof with a two-stepped surface having different outer diameters which consists of a large-diameter outer peripheral surface 62s1 and a small-diameter outer peripheral surface 61s2 which are in slidable contact with the large-diameter inner peripheral surface 61r1 and the small-diameter inner peripheral surface 61r3, respectively, so that the inner cylinder 62 can rotate inside the middle cylinder 61. The inner cylinder 62 is provided on the large-diameter outer peripheral surface 62s1 with a pair of click-ball accommodation holes (elements of the second click-stop mechanism) 62g which are positioned to be symmetrical with respect to the axis X3. A pair of click balls (elements of the second click-stop mechanism) 70 are accommodated in the pair of click-ball accommodation holes 62g, respectively. The pair of click balls 70 are biased radially outwards by a pair of compression coil springs (elements of the second click-stop mechanism) 71 to be engaged in the pair of click-ball engaging holes 61d of the middle cylinder 61, respectively, at a specific relative rotational angle between the middle cylinder 61 and the inner cylinder 62, i.e., when the grip 40 is in the retracted position as shown in FIG. 4.

Figure 21:
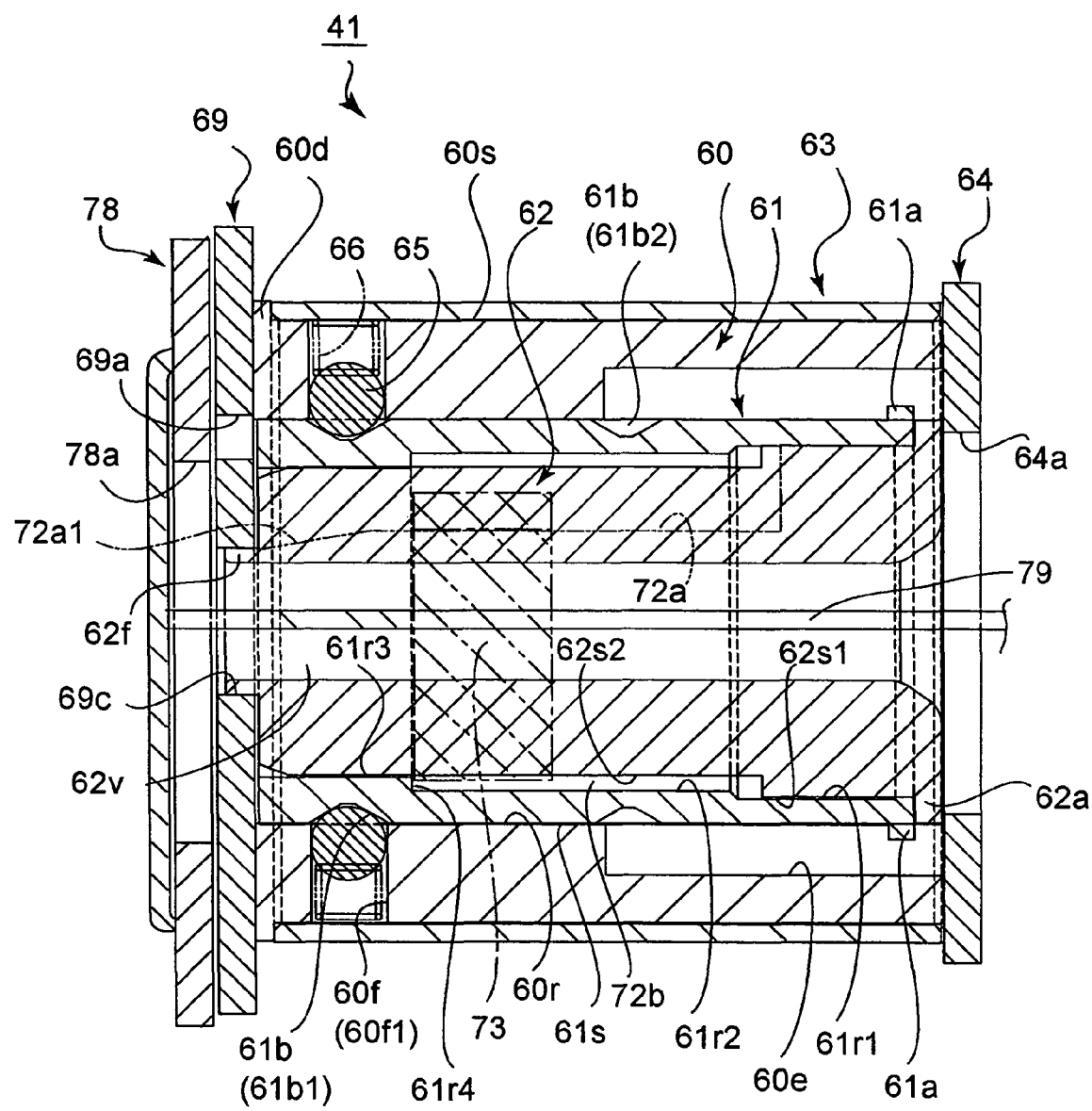
FIG. 21 is an axial cross sectional view of the pivot shaft mechanism in a grip-shaft contracted state.
Figure 24:
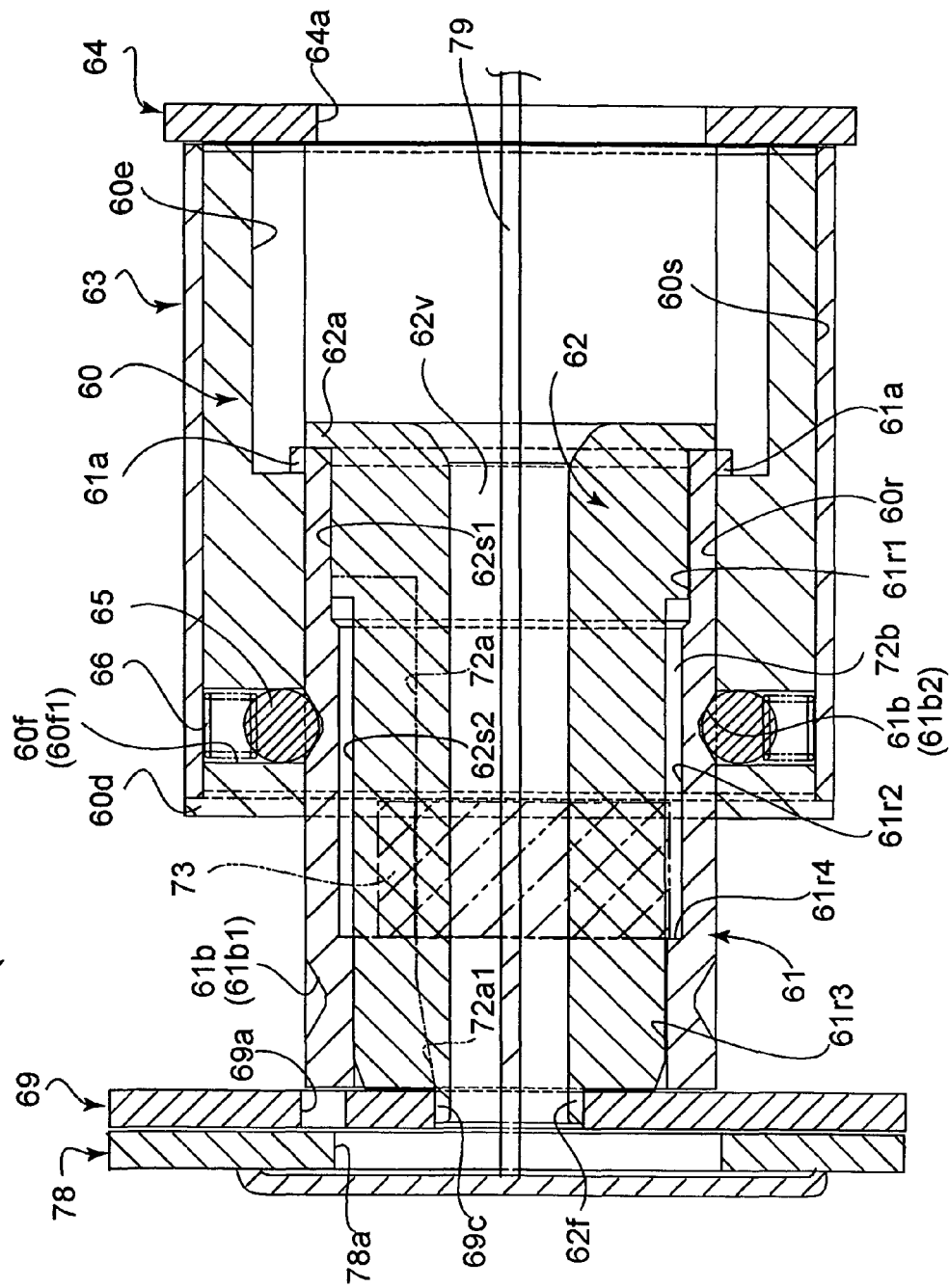
FIG. 24 is an axial cross sectional view of the pivot shaft mechanism in a grip-shaft jutted state.
Figure 31:
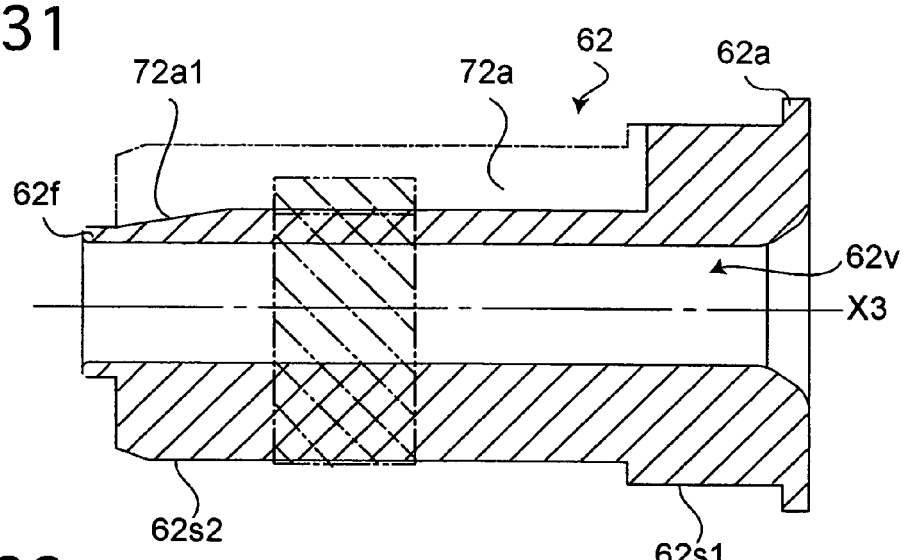
FIG. 31 is an axial cross sectional view of an inner cylinder which serves as an element of the pivot shaft mechanism.
Figure 32:
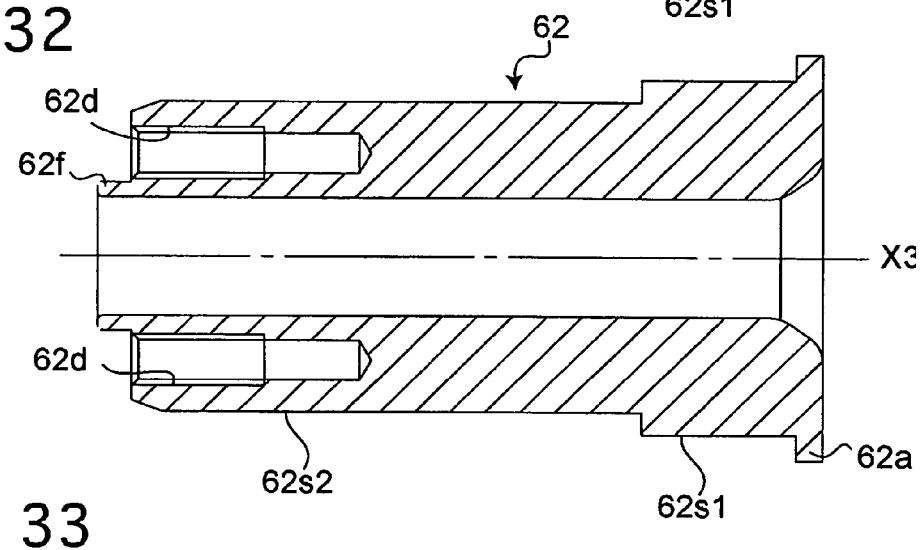
FIG. 32 is a view similar to that of FIG. 31, taken along a plane at a different circumferential position.
Figure 33:
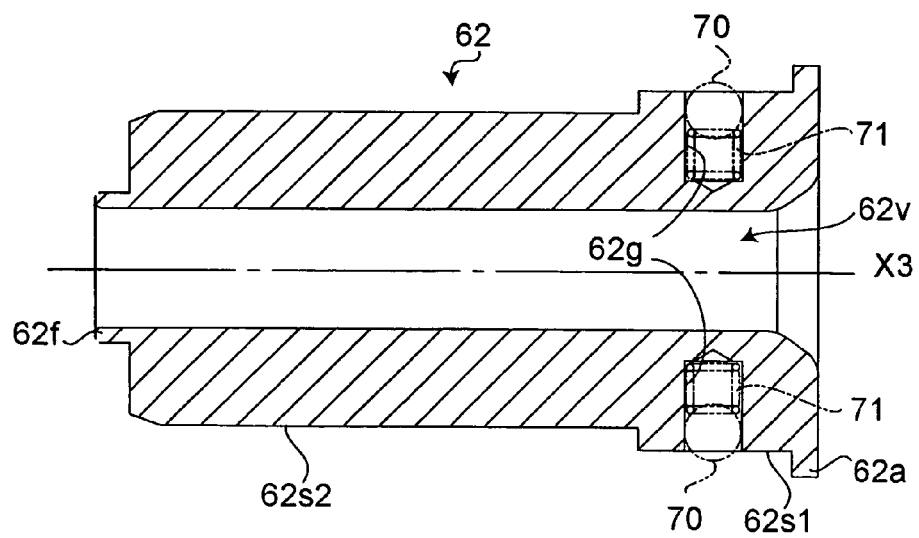
FIG. 33 is a view similar to that of FIG. 31, taken along a plane at another different circumferential position.
Figure 34:
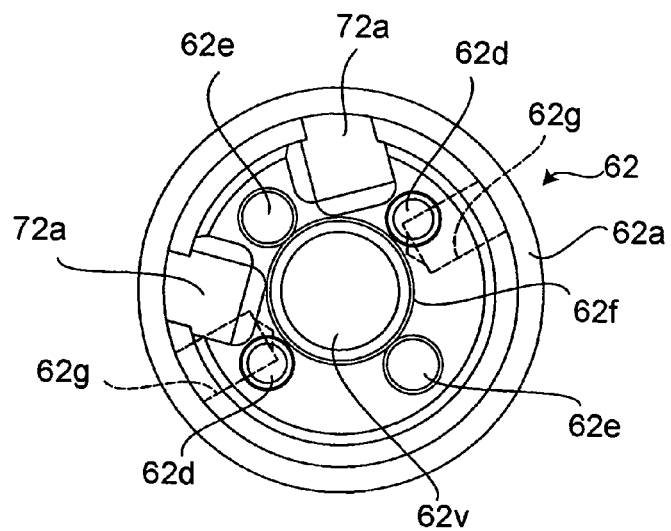
FIG. 34 is a front elevational view of an end of the inner cylinder, viewed from the grip side.

The pivot shaft 41 is provided between the small-diameter outer peripheral surface 62s2 of the inner cylinder and the intermediate-diameter inner peripheral surface 61r2 of the middle cylinder 61 with an accommodation space (an element of a grip-angle holding device) 72 in which a rotational friction spring (an element of the grip-angle holding device) 73 is accommodated. The accommodation space 72 is composed of a pair of elongated grooves (engaging recesses) 72a and an annular space 72b. Each of the pair of elongated grooves 72a is formed on the small-diameter outer peripheral surface 62s2 of the inner cylinder 62 by cutting out a part of the small-diameter outer peripheral surface 62s2 in the axial direction of the inner cylinder 62. The annular space 72b is formed by the difference in diameter between the small-diameter outer peripheral surface 62s2 and the intermediate-diameter inner peripheral surface 61r2. Each elongated groove 72a has an uniform cross section in the axial direction of the inner cylinder 62 (see FIG. 35) except for an end opening portion (engaging/introducing portion) 72a1 of the elongated groove 72a which is opened on the grip-side end's side of the inner cylinder 62. The end opening portion 72a1 of each elongated groove 72a is formed wider (larger) than the remaining portion of the elongated groove 72a (see FIGS. 21 and 24). Specifically, the bottom surface of the end opening portion 72a1 of each elongated groove 72a is inclined radially inwards in the direction that approaches the grip-side end of the inner cylinder 62 as shown in FIGS. 21, 24 and 31, while the circumferentially opposed side surfaces of the inner cylinder 62 in the end opening portion 72a1 of each elongated groove 72a are inclined circumferentially away from each other to gradually increase the width of the elongated groove 72a in the direction that approaches the grip-side end of the inner cylinder 62.

Figure 35:
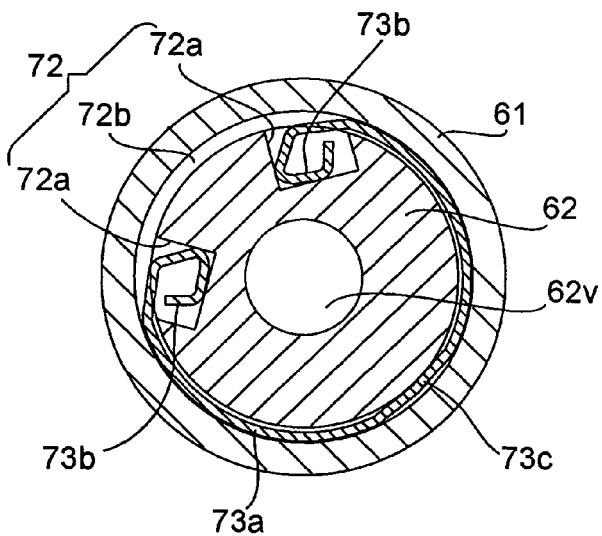
FIG. 35 is a cross sectional view of the inner cylinder and the outer cylinder with a rotational friction spring being inserted in between the inner cylinder and the outer cylinder, taken along a plane perpendicular to the axis of the pivot shaft mechanism.
Figure 36:
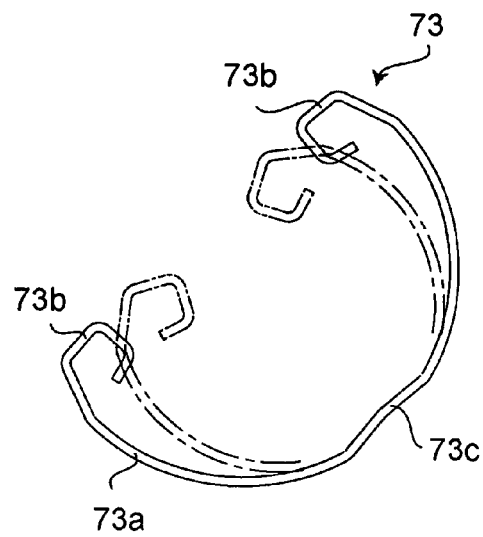
FIG. 36 is a front elevational view of the rotational friction spring shown in FIG. 35.

The rotational friction spring 73 is a substantially C-shaped leaf spring as shown in FIG. 36. The rotational friction spring 73 is provided with an arc-shaped arm portion 73a which is formed as a partial annular ring having an open portion, and a pair of bent end portions 73b formed at opposite ends of the arc-shaped arm portion 73a. Each bent end portion 73b is formed to have a substantially C-shaped cross section by bending the associated end portion of the rotational friction spring 73 radially inwards, toward the radially inside of the rotational friction spring 73, so that the pair of bent end portions 73b are symmetrically shaped. In addition, the arc-shaped arm portion 73a is provided at a center thereof with a central curved portion 73c which is curved to project radially inwards. The rotational friction spring 73 has the shape shown by solid line in FIG. 36 when in a free state, and can be bent inwards as shown by one-dot chain lines in FIG. 36 when resiliently deformed. FIG. 35 shows a state where the rotational friction spring 73 is installed in the accommodation space 72. In this state, the arc-shaped arm portion 73a is resiliently deformed radially inwards to be in pressing contact with the large-diameter inner peripheral surface 61r1 of the middle cylinder 61 by the resilient spring force of the arc-shaped arm portion 73a, the central curved portion 73c is in pressing contact with the small-diameter outer peripheral surface 62s2 of the inner cylinder 62, and the pair of bent end portions 73b are engaged in the pair of elongated grooves 72a, respectively. A cross section of each bent end portion 73b in a free state is greater in size than a cross section of the associated elongated groove 72a, and accordingly, the pair of bent end portions 73b are respectively engaged in the pair of elongated grooves 72a with the pair of bent end portions 73b being resiliently deformed to be in pressing contact with inner surfaces of the pair of elongated grooves 72a, respectively. Due to the presence of the rotational friction spring 73, the entirety of which is resiliently deformed in such a manner, a frictional resistance is applied between the middle cylinder 61 and the inner cylinder 62 by the rotational friction spring 73 when the middle cylinder 61 and the inner cylinder 62 rotate relative to each other. As shown in FIGS. 21 and 24, the width of the rotational friction spring 73 is smaller than the length of the accommodation space 72 in the direction of the axis X3 so that more than one rotational friction spring 73 can be installed in the accommodation space 72 side by side along the axis X3.

In brief, the structure of the pivot shaft 41 is such that the outer cylinder 60 is fixed to the body-side pivot support plate 64 while the inner cylinder 62 is fixed to the grip-side pivot support plate 69, that the middle cylinder 61, which is positioned between the outer cylinder 60 and the inner cylinder 62, is coupled to the outer cylinder 60 to be movable relative to the outer cylinder 60 in the direction of the axis X3 and is not rotatable relative to the outer cylinder 60, and that the middle cylinder 61 is coupled to the inner cylinder 62 to be rotatable relative to the inner cylinder 62 and not be relatively movable to each other in the direction of the axis X3.

Figure 22:
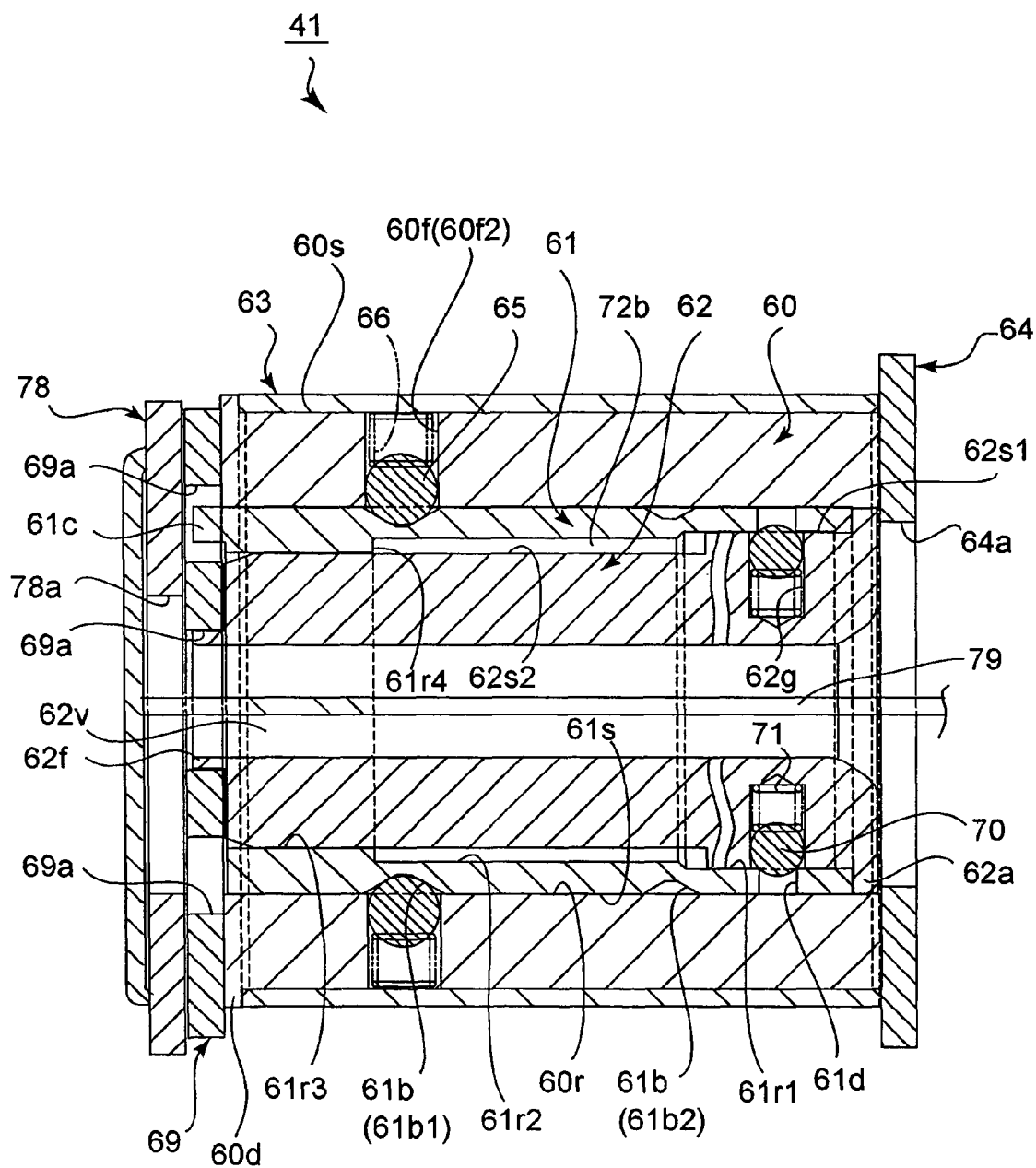
FIG. 22 is a view similar to that of FIG. 21, taken along a plane at a different circumferential position.
Figure 23:
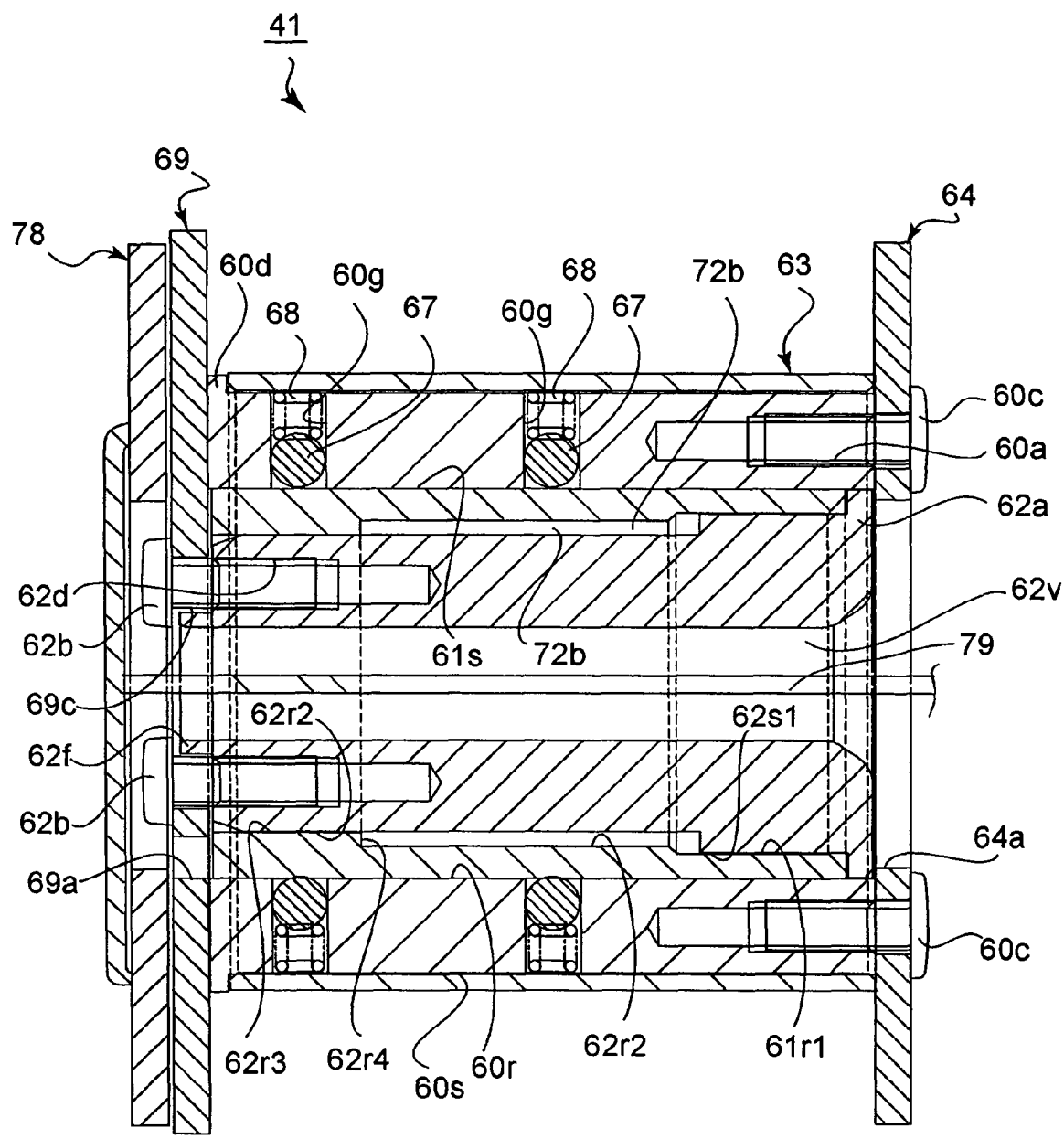
FIG. 23 is a view similar to that of FIG. 21, taken along a plane at another different circumferential position.

Operations of the grip shaft 41, i.e., operations of the present embodiment of the grip shaft mechanism will be discussed thereinafter. FIGS. 21 through 23 show cross sectional views, taken at different circumferential positions, of the internal structure of the grip shaft 41 in a grip-shaft contracted state. In this state, both the middle cylinder 61 and the inner cylinder 62 are accommodated in the outer cylinder 60, the body-side end of the inner cylinder 62 is in near contact with the body-side pivot support plate 64, and the grip-side end of the outer cylinder 60 is in near contact with the grip-side pivot support plate 69. The distance between the body-side pivot support plate 64 and the grip-side pivot support plate 69 (i.e., the length of the grip shaft 41) in the grip-shaft contracted state shown in FIGS. 21 through 23 is maintained at a constant distance by the engagement of the four click balls 65 that are accommodated in the four click-ball accommodation holes 60f of the outer cylinder 60 with the four front four click recesses 61b1 of the middle cylinder 61, respectively.

Figure 25:
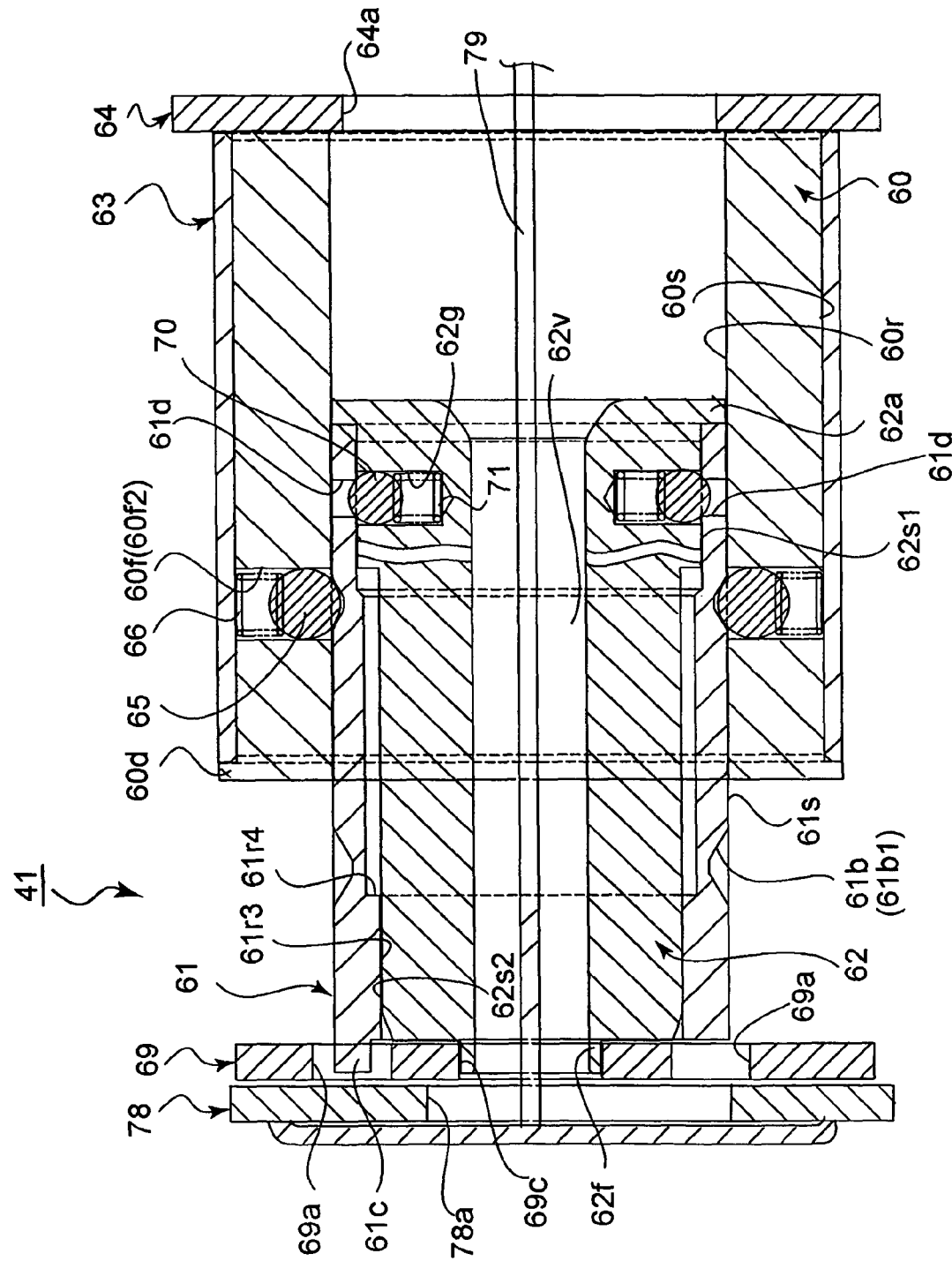
FIG. 25 is a view similar to that of FIG. 24, taken along a plane at a different circumferential position.

In the grip-shaft contracted state shown in FIGS. 21 through 23, pulling the grip 40 away from the camera body 11 along the axis X3 causes the grip shaft 41 to change from the grip-shaft contracted state to a grip-shaft jutted state shown in FIGS. 24 through 26. FIGS. 24 through 26 show cross sectional views, taken at different circumferential positions (which correspond to those shown in FIGS. 21 through 23, respectively), of the internal structure of the grip shaft 41 in the grip-shaft jutted state. Operations of the grip shaft 41 when jutted (pulled) out from the camera body 11 along the axis X3 thereof will be discussed thereinafter.

Pulling the grip 40 outward, so as to jut from the camera body 11 along the axis X3 (i.e., in a pulling direction), causes the inner cylinder 62 to move in the same pulling direction along the axis X3. The pulling direction corresponds to the leftward direction as viewed in FIGS. 21 through 23. In accordance with this moving force of the inner cylinder 62, the stop flange 62a of the inner cylinder 62 presses the end of the middle cylinder 61 on the body side to move the middle cylinder 61 together with the inner cylinder 62 in a direction away from the body-side pivot support plate 64. At the same time, the middle cylinder 61 linearly moves without rotating relative to the outer cylinder 60 since the middle cylinder 61 is linearly guided in the direction of the axis X3 by the engagement of the pair of linear guide projections 61a with the pair of linear guide grooves 60e.

Such a linear movement of the middle cylinder 61 relative to the outer cylinder 60 causes the four click balls 65 to be disengaged from the front four click recesses 61b1, respectively, to subsequently move on the outer peripheral surface 61s of the middle cylinder 61 while rolling thereon. Thereafter, upon the inner cylinder 62 and the middle cylinder 61 moving to the position (extended position) shown in FIG. 24 in which the pair of linear guide projections 61a are engaged with the bottom ends (left ends as viewed in FIG. 24) of the pair of linear guide grooves 60e, the four click balls 65 are engaged in the rear four click recesses 61b2 with a click action, respectively, to stop the movement of the inner cylinder 62 and the middle cylinder 61 relative to the outer cylinder 60. The four rear click recesses 61b2 are smaller in depth than the four front click recesses 61b1 as described above, and accordingly, the engaging force of the four click balls 65 with the four front click recesses 61b1 is greater than the engaging force of the four click balls 65 with the four rear click recesses 61b2.

On the other hand, when the grip 40 is retracted, the grip 40 only has to be pushed inward, in a direction so as to approach the camera body 11 (rightward as viewed in FIGS. 24 through 26). The force exerted on the grip 40 to push the grip 40 back toward the camera body 11 is exerted on elements of the grip shaft 41 via the grip-side pivot support plate 69, so that operations of the grip shaft 41 which are reversed from the above described operations performed in pulling the grip shaft 41 away from the camera body 11 are performed to bring the body-side pivot support plate 64 and the grip-side pivot support plate 69 closer to each other.

The grip 40 can be rotated about the axis X3 relative to the camera body 11 independently of outward and inward movements of the grip 40 along the axis X3. Operations of the grip shaft 41 when the grip 40 is rotated about the axis X3 relative to the camera body 11 will be hereinafter discussed.

Each of FIGS. 22 and 25 shows a state of the grip shaft 41 when the grip 40 is in the angular position shown in FIG. 4 (the aforementioned retracted position), in which the grip end surface 40a is oriented toward the front of the digital camera 10. As can be seen from FIGS. 22 and 25, the pair of click balls 70 that are provided on the inner cylinder 62 are engaged in the pair of click-ball engaging holes 61d of the middle cylinder 61, respectively, to stop the inner cylinder 62 rotating 15: relative to the middle cylinder 61. In this state, the rotational angle limit projection 61c of the middle cylinder 61 is positioned in the vicinity of one end (the right end as viewed in FIG. 37) of the rotational angle limit groove 69a of the grip-side pivot support plate 69 as shown by a solid line in FIG. 37, so that the grip 40 is prevented from rotating counterclockwise as viewed in FIG. 4 by the engagement of the one end (right end as viewed in FIG. 37) of the rotational angle limit groove 69a with the rotational angle limit projection 61c.

On the other hand, the grip 40 can be rotated relative to the camera body 11 clockwise as viewed in FIG. 4 from the angular position of the grip 40 shown in FIG. 4. Rotating the grip 40 clockwise from the position shown in FIG. 4 with a torque greater than the spring force of the pair of compression coil springs 71 causes the pair of click balls 70 to be disengaged from the pair of click-ball engaging holes 61d to allow the inner cylinder 62 to rotate relative to the middle cylinder 61, thus allowing the grip 40 to rotate clockwise. Upon the disengagement of the pair of click balls 70 from the pair of click-ball engaging holes 61d, each click ball 70 moves on the large-diameter inner peripheral surface 61r1 of the middle cylinder 61 while rolling thereon to allow the middle cylinder 61 and the inner cylinder 62 to rotate relative to each other. The clockwise rotation of the grip 40 causes the rotational angle limit projection 61c to move in the rotational angle limit groove 69a of the grip-side pivot support plate 69 therealong, and the rotational angle limit projection 61c reaches the other end (the left end as viewed in FIG. 37) of the rotational angle limit groove 69a as shown by one-dot chain line in FIG. 37 to prevent the grip 40 from further rotating in the same direction upon the grip 40 being rotated up to the angular position thereof shown in FIG. 5 (i.e., the aforementioned rearward-extending position). Thereafter, if the grip 40 is rotated back to the retracted position as shown in FIG. 4, the pair of click balls 70 click-engage with the pair of click-ball engaging holes 61d of the middle cylinder 61, respectively, to stop further rotation of the grip 40.

As described above, the rotational friction spring 73 that is accommodated in the accommodation space 72 applies a frictional resistance to the middle cylinder 61 and the inner cylinder 62 therebetween when the middle cylinder 61 and the inner cylinder 62 rotate relative to each other. Specifically, the arc-shaped arm portion 73a and the central curved portion 73c of the rotational friction spring 73 are in pressing contact with the intermediate-diameter inner peripheral surface 61r2 of the middle cylinder 61 and the small-diameter outer peripheral surface 62s2 of the inner cylinder 62, respectively, and also the pair of bent end portions 73b of the rotational friction spring 73 are in pressing contact with inner surfaces of the pair of elongated grooves 72a, respectively. Therefore, the rotational friction spring 73 presses against the small-diameter outer peripheral surface 62s2 and the intermediate-diameter inner peripheral surface 61r2 at a plurality of points (or areas) thereon to be supported between the small-diameter outer peripheral surface 62s2 and the intermediate-diameter inner peripheral surface 61r2, and accordingly, a frictional resistance can be applied between the small-diameter outer peripheral surface 62s2 and the intermediate-diameter inner peripheral surface 61r2 more efficiently than in the case of using a simple annular leaf spring. In addition, clockwise or counterclockwise rotation of the inner cylinder 62 as viewed in FIG. 35, which is caused by a rotation of the grip 40, causes each bent end portion 73b of the rotational friction spring 73 to be drawn into the associated elongated groove 72a so that the frictional resistance by the rotational friction spring 73 increases. Accordingly, if the accommodation space 72 and the rotational friction spring 73 are constructed in the above described manner, a strong friction can be produced between the small-diameter outer peripheral surface 62s2 and the intermediate-diameter inner peripheral surface 61r2 within a radially narrow space, so that the middle cylinder 61 and the inner cylinder 62 can be held stably with no play therebetween in a rotational direction. Consequently, the grip 40 can be stopped and held securely at any desired angular position in a range between the retracted position (the position shown in FIG. 4) and the rearward-extending position (the position shown in FIG. 5), e.g., at the angular position shown in FIG. 6 or the angular position shown in FIG. 7.

Since more than one rotational friction spring 73 can be installed in the accommodation space 72 side by side along the axis X3 as mentioned above, the frictional engaging force between the middle cylinder 61 and the inner cylinder 62 via the rotational friction spring 73 can be easily adjusted by changing the number of the rotational friction springs 73 installed in the accommodation space 72 with no increase in radial thickness of the accommodation space 72 for accommodating the rotational friction spring(s) 73. Specifically, the frictional engaging force between the middle cylinder 61 and the inner cylinder 62 via the rotational friction spring 73 is required to be set to a degree so as not only to prevent the camera body 11 from unintentionally tilting relative to the grip 40 by the own weight of the camera body 11 when the grip 40 is manually held by the user, but also to allow the grip 40 to be manually rotated smoothly, and such a requirement can be easily satisfied by increasing or decreasing the number of the rotational friction springs 73.

The rotational friction spring 73 can be easily handled during assembly because the rotational friction spring 73 is held on the inner cylinder 62 without coming off the inner cylinder 62 once the rotational friction spring 73 is accommodated in the accommodation space 72 with the pair of bent end portions 73b being engaged in the pair of elongated grooves 72a, respectively. When the grip shaft 41 is assembled, the inner cylinder 62 can be inserted into the middle cylinder 61 from the end thereof on the body side (from the right hand side as viewed in FIGS. 29 and 30) after the rotational friction spring 73 is installed on the end of the inner cylinder 62 on the grip side with the pair of bent end portions 73b being engaged in the end opening portions 72a1 of the pair of elongated grooves 72a, respectively. Upon the inner cylinder 62 being inserted into the middle cylinder 61 by a certain amount, the rotational friction spring 73 enters into the front end portion of the accommodation space 72 (i.e., comes into contact with a stepped pressure portion 61r4 formed between the small-diameter inner peripheral surface 61r3 and the intermediate-diameter inner peripheral surface 61r2) and thereafter further insertion of the inner cylinder 62 into the middle cylinder 61 causes the rotational friction spring 73 to be pushed gradually toward the inner end portion of the accommodation space 72 (toward the body's side end of the middle cylinder 61) in accordance with the inserting force exerted on the inner cylinder 62. At this time, each bent end portion 73b is pressed radially outwards by an inclined bottom surface of the inner cylinder 62 in the end opening portion 72a1 of the associated elongated groove 72a to move radially outwards gradually to approach the intermediate-diameter inner peripheral surface 61r2 of the middle cylinder 61 so that the amount of resilient deformation of each bent end portion 73b increases. Additionally, since the opposed side surfaces of the inner cylinder 62 in the end opening portion 72a1 of each elongated groove 72a are inclined circumferentially toward each other to gradually decrease the width of the elongated groove 72a in the direction that approaches the end of the inner cylinder 62 on body-side, each bent end portion 73b is also pressed circumferentially by the opposed side surfaces so that the amount of resilient deformation of each bent end portion 73b increases. Thereafter, upon the inner cylinder 62 being fully inserted into the middle cylinder 61 to the position shown in FIG. 21 or 24, each bent end portion 73b is disengaged from the end opening portion 72a1 of the associated elongated groove 72a to be engaged with the portion of the elongated groove 72a which has a uniform cross section (the shallow depth portion of the elongated groove 72a), so that the frictional engaging force between the middle cylinder 61 and the inner cylinder 62 via the rotational friction spring 73 becomes maximum. Accordingly, in the installation of the rotational friction spring 73 into the accommodation space 72, the possibility of the rotational friction spring 73 falling off does not have to be taken into account because the frictional engaging force between the middle cylinder 61 and the inner cylinder 62 via the rotational friction spring 73 is gradually increased through the use of the insertion movement of the inner cylinder 62 into the middle cylinder 61 in the direction of the axis X3, which results in an improvement in workability of assembling the pivot shaft mechanism.

Although both the radial depth and the circumferential width of the end opening portion 72a1 of each elongated groove 72a gradually increase in the direction that approaches the end of the inner cylinder 62 on the grip-side in the present embodiment of the pivot shaft mechanism, a similar effect can be expected even if the end opening portion 72a1 of each elongated groove 72a is formed so that only one of the radial depth and the circumferential width of the end opening portion 72a1 of each elongated groove 72a gradually increases in the direction that approaches the end of the inner cylinder 62 on the grip-side. However, the friction produced by the rotational friction spring 73 can be increased more efficiently when both the radial depth and the circumferential width of the end opening portion 72a1 of each elongated groove 72a gradually increase in the direction that approaches the end of the inner cylinder 62 on the grip-side.

Internal circuitry of the camera body 11 has been discussed above with reference to FIGS. 13 through 16. FIG. 40 schematically shows electrical components of the whole of the digital camera 10 which includes the camera body 11 and the grip 40. The grip 40 is provided with three switch substrates 74, 75 and 76 which receive inputs from the shutter release button 45, the ring-shaped zoom switch 46 and the moving-image recording button 47, respectively, and is further provided with a pair of electrical contacts 77 which come in contact with a pair of electrodes of the battery pack 42 (see FIG. 39), respectively. The switch substrates 74, 75 and 76 and the pair of electrical contacts 77 which are provided inside of the grip 40 are connected to terminal areas on a connector stationary substrate 78 via lead wires 74a, 75a, 76a and 77a, respectively.

As shown in FIGS. 17 and 19 through 26, the connector stationary substrate 78 is positioned adjacent to the grip-side pivot support plate 69, and is fixed to the grip 40 together with the grip-side pivot support plate 69 by set screws 69d. The connector stationary substrate 78 is provided at a center thereof with a through-hole 78a which is communicatively connected with the central circular through-hole 69c in a state where the connector stationary substrate 78 is fixed to the grip 40. As shown in FIGS. 21 through 26, the central circular through-hole 69c is further communicatively connected with one end of the through space 62v, while the other end of the through space 62v is communicatively connected with the central circular through-hole 64a of the body-side pivot support plate 64. Namely, the whole of the grip shaft 41 that includes the connector stationary substrate 78 includes a through space via which an internal space of the grip 40 and an internal space of the camera body 11 are communicatively connected with each other.

Figure 15:
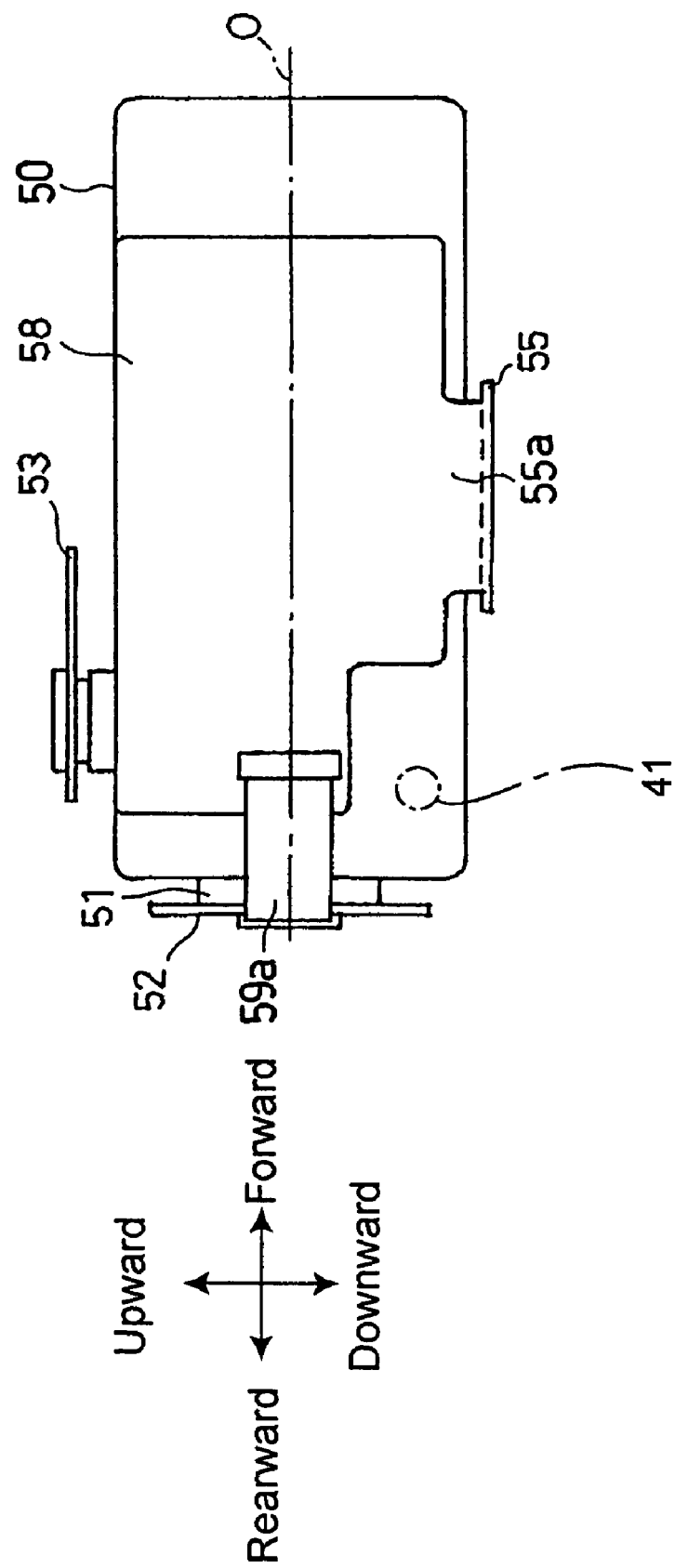
FIG. 15 is a side elevational view of the internal elements shown in FIG. 13.
Figure 16:
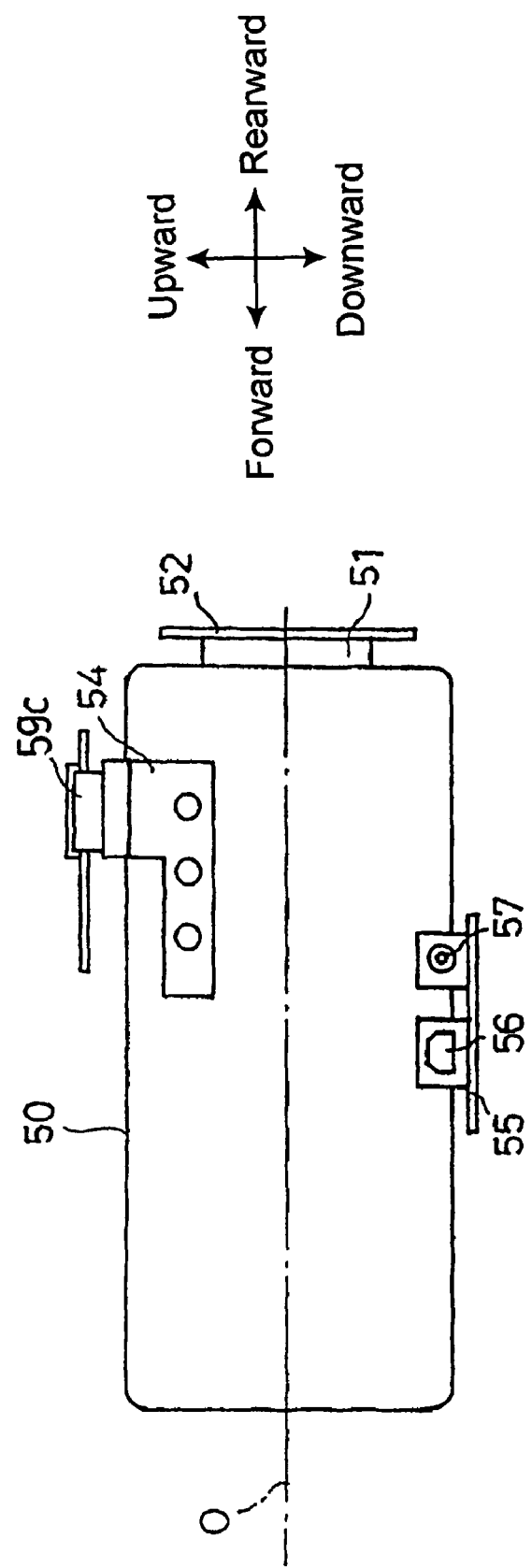
FIG. 16 is a side elevational view of the internal elements shown in FIG. 13, viewed from the side opposite to the side shown in FIG. 15.
Figure 39:
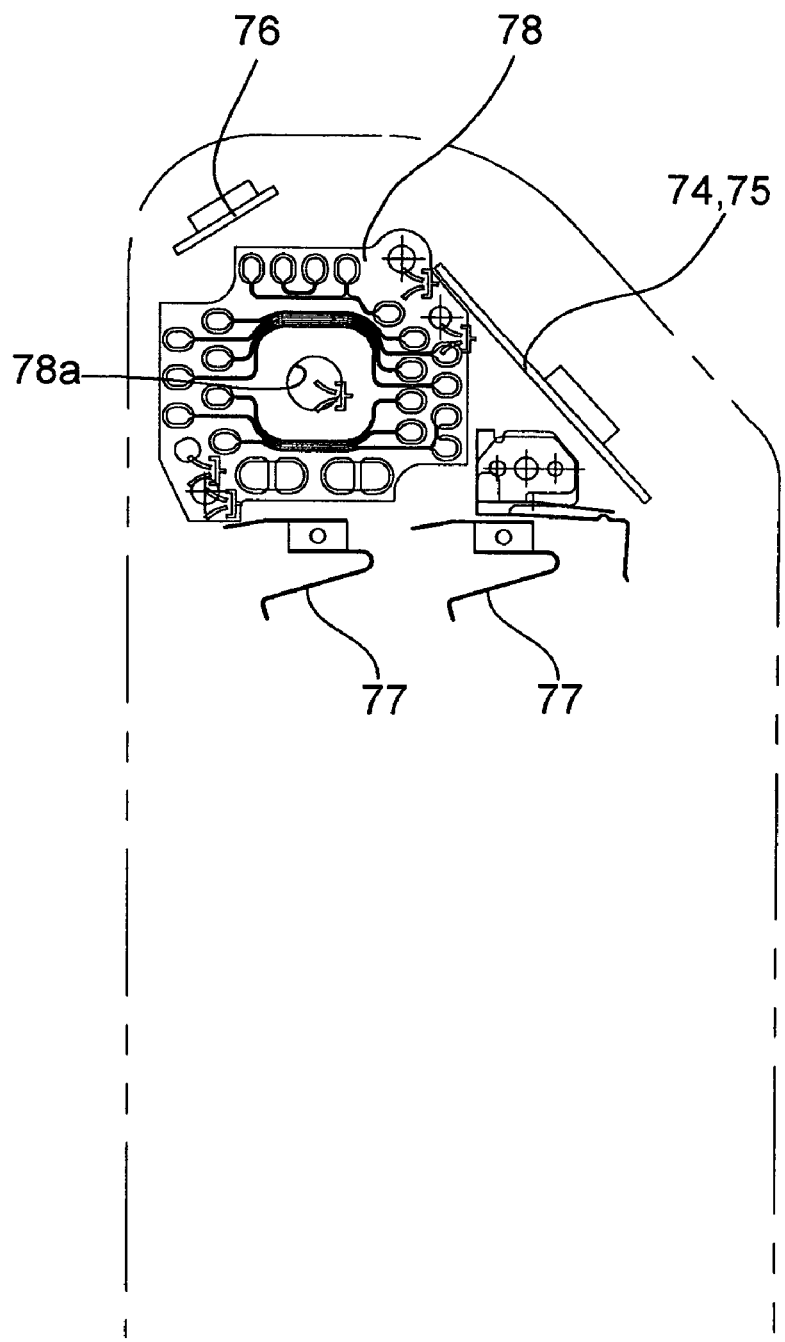
FIG. 39 is a plan view, partly as a transparent view, of a portion of the electrical components provided in the grip.
Figure 40:
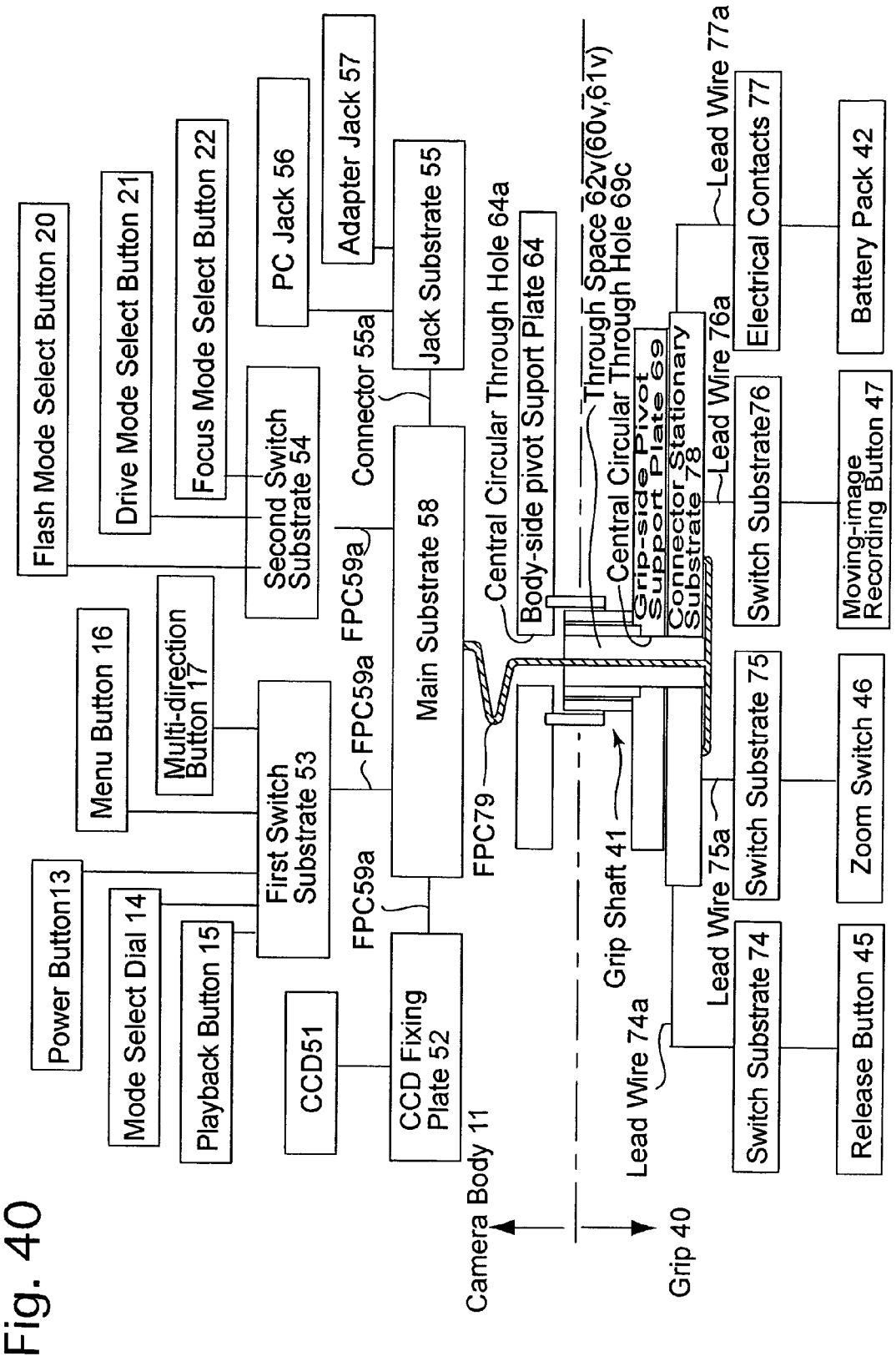
FIG. 40 is a block diagram of the electrical components of the digital camera shown in FIGS. 1 and 2.

As shown in FIG. 39, the connector stationary substrate 78 is provided with a plurality of terminals. In the connector stationary substrate 78, a left half of the plurality of terminals as viewed in FIG. 39 are connected to electrical components provided in the grip 40, while a right half of the plurality of terminals as viewed in FIG. 39 are connected to terminals on the main substrate 58. The digital camera 10 is provided with a bundle of connecting lead wires 79 which extends between the camera body 11 and the grip 40. Common ends of the connecting lead wires 79 are connected to terminals on the right half terminals on the connector stationary substrate 78. In FIGS. 17, 21 through 26 and 40, the bundle of connecting lead wires 79 is shown as a single lead wire for the purpose of illustration. The bundle of connecting lead wires 79 is inserted into the through space 62v of the grip shaft 41 to extend from the central circular through-hole 64a to the inside of the camera body 11 so that the other ends of the connecting lead wires 79 are connected to terminals on the main substrate 58 (see FIG. 40). The bundle of connecting lead wires 79 is installed between the connector stationary substrate 78 and the main substrate 58 so as to have sufficient length for coping with the expansion/contraction operation of the grip shaft 41 along the axis X3 (the outward/inward movement of the middle cylinder 61 and the inner cylinder 62 relative to the outer cylinder 60) and rotation of the grip shaft 41 about the axis X3 (rotation of the inner cylinder 62 relative to the middle cylinder 61 by the maximum rotational angle of approximately 180 degrees). More specifically, the main substrate 58 is shaped to have a cutout portion, the position of which corresponds to the position of the grip shaft 41 in the direction of the axis X3 as shown in FIG. 15, and this cutout portion of the main substrate 58 is positioned below the flexible PWB 59a on the left hand side of the connector 55a as viewed in FIG. 15. When the grip 40 is in the retracted position, the slack of the bundle of connecting lead wires 79 is accommodated in the cutout portion of the main substrate 58 in the camera body 11. Namely, the main substrate 58 is provided with the cutout portion so as not to interfere with the slack of the bundle of connecting lead wires 79 which occurs when the grip 40 is in the retracted position. Pulling the grip 40 so as to jut from the camera body 11 causes the bundle of connecting lead wires 79 to be drawn into the grip shaft 41 to some extent from the camera body 11.

Similar to the grip 40 that is capable of moving relative to the camera body 11 in the above illustrated embodiment of the digital camera, various types of movable members capable of not only rotating relative to a body member but also moving toward and away from the body member are known in the art. In a device having such a movable member, the moving manner of the movable member, in which the movable member both rotates and moves linearly, is complicated, and accordingly, a sufficient length of lead wires or flexible PWB needs to be secured while the lead wires or the flexible PWB must be skillfully installed so as not to interfere with the operation of the movable member. Conventionally, electrical parts provided in the movable member (e.g., sub-substrates such as the switch substrates 74, 75 and 76) and electrical parts provided in the body member (e.g., the main substrate 58) are generally connected together simply via lead wires or a flexible PWB. However, in this conventional wiring structure, there is a possibility of the lead wires or the flexible PWB being caught on other internal members so that the lead wires or the flexible PWB interferes with the smooth operation of the movable member. If the lead wires or the flexible PWB are caught on other internal members, tension on the lead wires or the flexible PWB directly acts on the sub-substrate in the movable member, so that there is a possibility of the sub-substrate becoming deformed or becoming detached accidentally if the tension is great. In regard to this problem, unlike in the case of the above described pivot shaft mechanism of the present invention, if each of the switch substrates 74, 75 and 76 and the pair of electrical contacts 77 were to be directly connected to the main substrate 58 via a bundle of lead wires with no connector such as the connector stationary substrate 78, an excessive load would be applied to the switch substrates 74, 75 and 76 and the pair of electrical contacts 77 if the bundle of lead wires gets caught at some midpoint thereof on other internal members. Accordingly, there is little possibility of lead wires being caught on other internal members inside the camera body 11 and the grip 10 shaft 41, in which lead wires can be bundled and installed with no relatively complicated wiring, whereas there is a high possibility of lead wires being caught on other internal members in the grip 40, in which lead wires are installed to extend toward different switch plates and different terminals in different directions.

Unlike such a conventional wiring structure, each of the lead wires 74a, 75a, 76a and 77a in the grip 40 is connected to the connector stationary substrate 78 that is a stationary member provided in the same grip 40, and the wiring of the lead wires 74a, 75a, 76a and 77a is completed in the grip 40. Therefore, even if the grip 40 is rotated relative to the camera body 11 or moved toward and away from the camera body 11, no tension acts on any of the lead wires 74a, 75a, 76a and 77a that are provided inside the grip 40. The bundle of connecting lead wires 79 is responsible for the wiring between the camera body 11 and the grip 40. Since the connector stationary substrate 78, to which one end of the bundle of connecting lead wires 79 is connected, is fixed to the end of the grip shaft 41 on the grip side, the wiring conditions need to be considered with regard only to the inside of the grip shaft 41 and the inside of the camera body 11. As mentioned above, there is less possibility of lead wires being caught on other internal members in the inside of each of the camera body 11 and the grip shaft 41 than in the inside of the grip 40. In addition, should a situation occur wherein tension acts on the bundle of connecting lead wires 79, the connector stationary substrate 78 is more resistant to stress than the switch substrates 74, 75 and 76 and the pair of electrical contacts 77 and also more difficult to be detached accidentally than the switch substrates 74, 75 and 76 and the pair of electrical contacts 77 because the connector stationary substrate 78 is a high-strength member which is formed substantially integral with the grip shaft 41. Accordingly, the electrical components provided in the present embodiment of the digital camera are more resistant to malfunction caused by the rotational operation of the grip 40.

As can be understood from the above description, the present embodiment of the pivot shaft mechanism according to the present invention is constructed as a three-layered pivot shaft mechanism so that the outer cylinder 60, which is positioned radially outside of the middle cylinder 61, gives support to linear forward/inverse movements of the pivot shaft mechanism, and so that the inner cylinder 62, which is positioned radially inside of the middle cylinder 61, supports rotational movements of the pivot shaft mechanism. This structure makes it possible for the pivot shaft mechanism to be both rotated smoothly about the axis X3 and moved smoothly along the axis X3. In addition, a reduction in the number of elements of the pivot shaft mechanism is achieved because the outer cylinder 60 and the inner cylinder 62 are guided by a common member, i.e., the middle cylinder 61. Moreover, the pivot shaft mechanism is designed in a space-saving manner since the three-layered cylinders: the outer cylinder 60, the middle cylinder 61 and the inner cylinder 62, are concentrically arranged, which makes it possible to achieve a compact pivot shaft mechanism. Furthermore, the grip 40 and the camera body 11 can be electrically connected with each other with the pivot shaft mechanism remaining compact in size by the above described structure wherein the inner cylinder 62 is formed as a cylindrical member including the through space 62v that extends in the direction of the axial X3 and wherein the bundle of lead wires 79 is made to pass through the inner cylinder 62 in order to install the bundle of lead wires 79.

Figure 41:
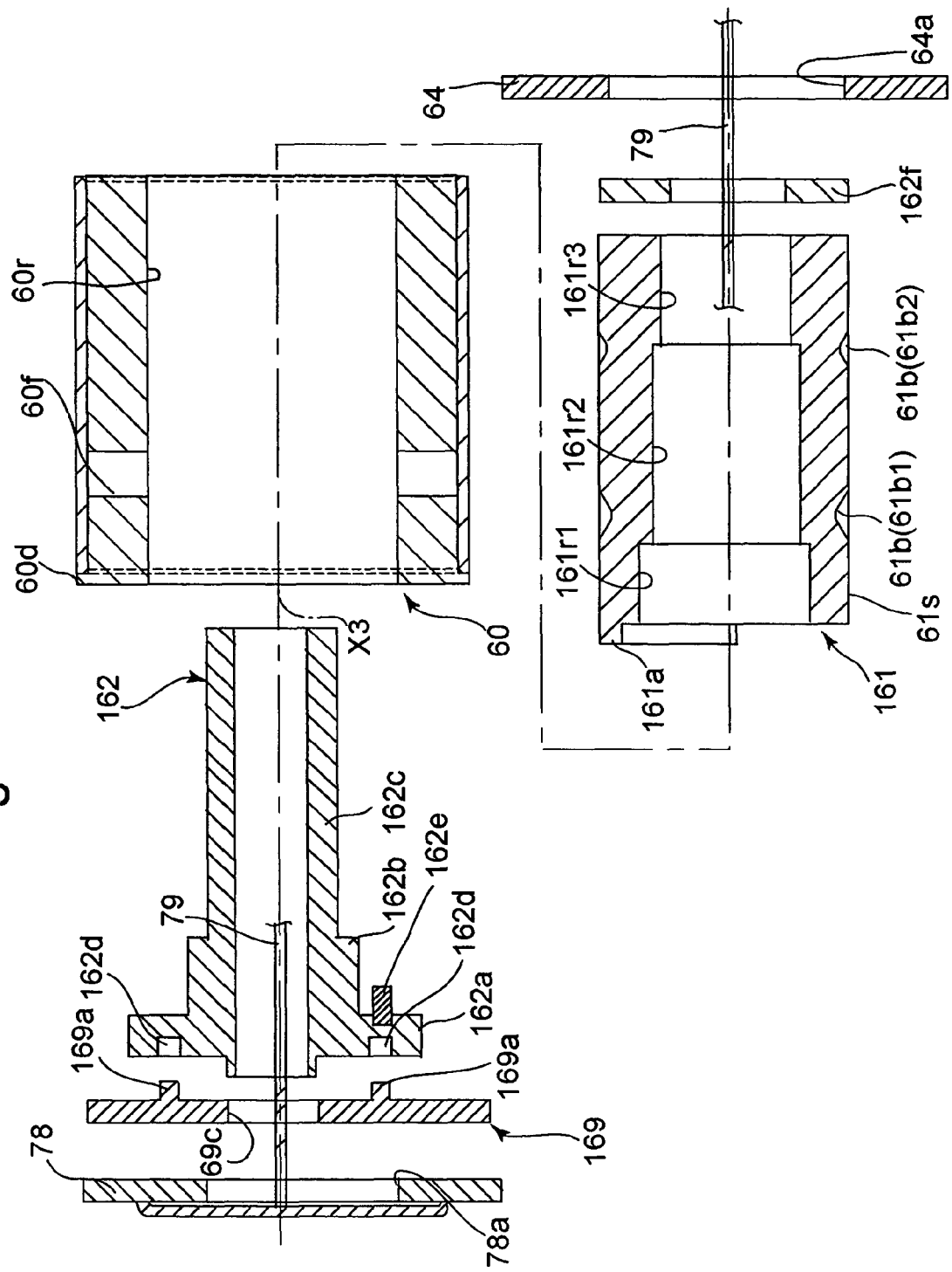
FIG. 41 is an exploded cross sectional view of elements of a second embodiment of the pivot shaft mechanism according to the present invention.
Figure 42:
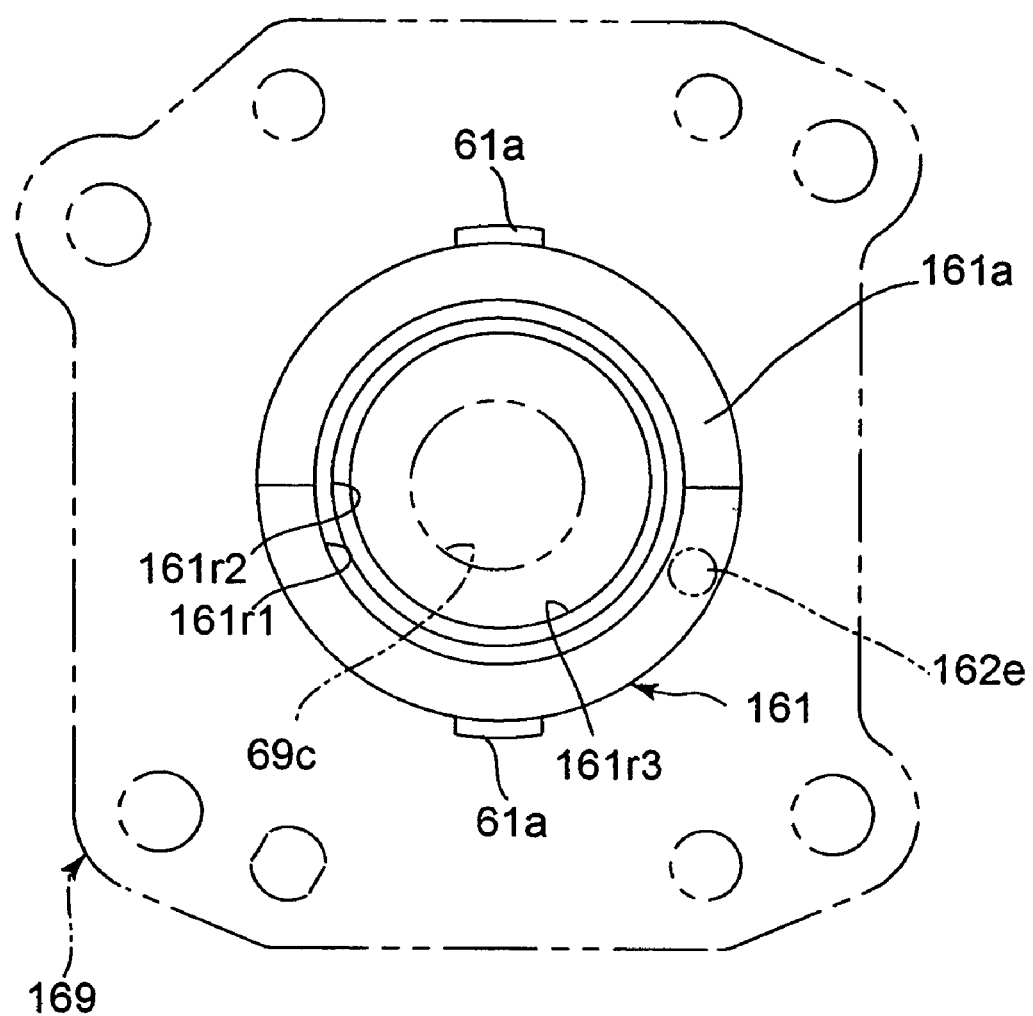
FIG. 42 is an elevational view of a middle cylinder which serves as an element of the second embodiment of the pivot shaft mechanism, viewed from the grip side.

FIGS. 41 and 42 show the second embodiment of the pivot shaft mechanism according to the present invention. In FIGS. 41 and 42, elements or portions similar to those of the first embodiment of the pivot shaft mechanism are designated by the same reference numerals. Additionally, those portions of the second embodiment of the pivot shaft mechanism which are not discussed below shall be the same as those of the first embodiment of the pivot shaft mechanism.

An inner cylinder (inner shaft/rotatable shaft element/grip-side cylindrical shaft member) 162 is provided on an outer peripheral surface thereof with a three-stepped surface having different outer diameters which consists of a large-diameter cylindrical portion 162a, an intermediate-diameter cylindrical portion 162b and a small-diameter cylindrical portion 162c in that order in a direction from the grip side (the left end as viewed in FIG. 41) to the body side (the right end as viewed in FIG. 41) of the inner cylinder 162, so that the diameter thereof is reduced stepwise. The inner cylinder 162 is provided, on an end surface thereof at the end of the inner cylinder 162 on the grip side which faces a grip-side pivot support plate (pivot support member) 169, with a pair of rotation limit holes 162d. The pair of rotation limit holes 162d correspond to the pair of rotation limit holes 62e of the first embodiment of the pivot shaft mechanism. A pair of positioning pins 169a which project from the grip-side pivot support plate 169 are engaged in the pair of screw holes 162d, respectively. The grip-side pivot support plate 169 and the inner cylinder 162 are fixed to each other by a fixing device (not shown) which corresponds to the pair of set screws 62b used in the first embodiment of the pivot shaft mechanism.

The outer diameter of the large-diameter cylindrical portion 162a of the inner cylinder 162 is greater than the inner diameter of the outer cylinder 60. The large-diameter cylindrical portion 162a is provided, on a surface thereof which faces a grip side end surface of the outer cylinder 60 (the stop flange 60d), with a rotation limit pin 162e capable of entering the inside of the outer cylinder 60. Inserting the inner cylinder 162 into a middle cylinder (rotatable support barrel) 161 from the grip-side pivot support plate 169 side causes the large-diameter cylindrical portion 162a to approach an arc-shaped projection 161a which is formed on an adjacent end surface of the middle cylinder 161 to project toward the grip-side pivot support plate 169. The range of rotation of the middle cylinder 161 relative to the grip-side pivot support plate 169 and the inner cylinder 162 about the axis X3 is limited to approximately 180 degrees by the engagement of the arc-shaped projection 161a with the rotation limit pin 162e. As shown in FIG. 42, the arc-shaped projection 161a is formed to extend over a range of approximately 180 degrees about the axis X3, and accordingly, the middle cylinder 161 can rotate relative to the inner cylinder 162 in a range the opposite ends of which are determined by the engagement of one of the circumferentially opposite ends of the arc-shaped projection 161a with the rotation limit pin 162e and the engagement of the other end of the arc-shaped projection 161a with the rotation limit pin 162e, respectively.

The middle cylinder 161 is provided on an inner peripheral surface thereof with a three-stepped surface having different inner diameters which consists of a large-diameter inner peripheral surface 161r1, an intermediate-diameter inner peripheral surface 161r2, and a small-diameter inner peripheral surface 161r3, in that order in a direction from the grip side (the left end as viewed in FIG. 41) to the body side (the right end as viewed in FIG. 41) of the middle cylinder 161, so that the diameter thereof is reduced stepwise. The diameters of the large-diameter inner peripheral surface 161r1 and the small-diameter inner peripheral surface 161r3 of the middle cylinder 161 are determined to correspond to the intermediate-diameter cylindrical portion 162b and the small-diameter cylindrical portion 162c of the inner cylinder 162 so that the large-diameter 10 inner peripheral surface 161r1 and the small-diameter inner peripheral surface 161r3 can be rotatably fitted on the intermediate-diameter cylindrical portion 162b and the small-diameter cylindrical portion 162c, respectively. A grip-angle holding device (not shown) 15 which corresponds to the rotational friction spring 73 of the first embodiment of the pivot shaft mechanism is accommodated in the space between the intermediate-diameter inner peripheral surface 161r2 and an outer peripheral surface of the small-diameter cylindrical portion 162c.

A stop ring (radial projection/radial member/ring member) 162f is fixed to the end (the right end of the small-diameter cylindrical portion 162c as viewed in FIG. 41) of the inner cylinder 162 on the body side. The stop ring 162f corresponds to the stop flange 62a of the first embodiment of the pivot shaft mechanism, and is different from the stop flange 62a in that the stop ring 162f is independent of the inner cylinder 162, whereas the stop flange 62a is integral with the inner ring 62. The stop ring 162f is fixed to the inner ring 162 by an appropriate fixing device such as screws or an adhesive.

During an assembling operation of the pivot shaft mechanism, the middle cylinder 161 is inserted into the outer cylinder 60 from the camera body 11 side (the body-side pivot support plate 64 side) while the inner cylinder 162 is inserted into the outer cylinder 60 fitted into the middle cylinder 161 from the grip 40 side (the grip-side pivot support plate 169 side). Thereupon, the large-diameter cylindrical portion 162a is in contact with the stop flange 60d. Thereafter, when the stop ring 162f is fixed to the body's side end of small-diameter cylindrical portion 162c of the inner cylinder 162, the middle cylinder 161 is sandwiched between the stop ring 162f and the large-diameter cylindrical portion 162a so that the middle cylinder 161 and the inner cylinder 162 become integral with each other so as not to be relatively movable in the direction of the axis X3.

Similar to the first embodiment of the pivot shaft mechanism, the connector stationary substrate 78 is fixed to the grip-side pivot support plate 169, while the bundle of connecting lead wires 79 via which the connector stationary substrate 78 and the main substrate 58 are connected to each other passes through the internal space of the inner cylinder 162.

As can be understood from the above described second embodiment of the pivot shaft mechanism, structural details of each cylindrical member which serves as an element of the extendable pivot shaft (pivot shaft mechanism) can be modified as needed within the spirit and scope of the invention.

The present invention is not limited solely to the particular embodiment described above. For instance, although the inner cylinder 62 that supports rotational movements of the pivot shaft mechanism is fixedly installed on the grip 40 side while the outer cylinder 60 that gives support to linear forward/inverse movements of the pivot shaft mechanism is fixedly installed on the camera body 11 side, this positional relationship between the inner cylinder 62 and the outer cylinder 60 is reversible, i.e., the inner cylinder 62 can be fixedly installed on the camera body 11 side while the outer cylinder 60 can be fixedly installed on the grip 40 side.

Although the above described embodiment of the pivot shaft mechanism is provided with a first click-stop mechanism (65 and 61*b*) for defining stop positions in the range of linear movement of the grip 40 along the rotational axis thereof and a second click-stop mechanism (70 and 61*d*) for defining a stop position in the range of rotation of the grip 40 about the rotational axis thereof in the above described embodiment of the pivot shaft mechanism, these click-stop mechanisms can be omitted.

The present invention can be applied to any extendable pivot shaft mechanism other than an extendable pivot shaft mechanism of a camera for pivoting a rotatable grip on a camera body so that the extendable pivot shaft mechanism is used to connect electrically-connected two members with each other which are both rotatable about a rotational axis and movable along the rotational axis relative to each other.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An extendable pivot shaft mechanism of a camera for pivoting a rotatable grip on a camera body to allow said rotatable grip both to rotate about a rotational axis and to move along said rotational axis relative to said camera body,
    wherein said extendable pivot shaft mechanism comprises an inner shaft, a middle cylinder and an outer cylinder which are concentrically arranged about said rotational axis,
    wherein said inner shaft and said outer cylinder are fixed to one and the other of said grip and said camera body, respectively,
    wherein one of said inner shaft and said outer cylinder serves as a rotatable shaft element which is rotatable about said rotational axis relative to said middle cylinder,
    wherein the other of said inner shaft and said outer cylinder serves as a linearly movable shaft element which is linearly movable along said rotational axis relative to said middle cylinder; and
    a click-stop mechanism, provided between said middle cylinder and said linearly movable shaft element, for stopping said linearly movable shaft element moving along said rotational axis relative to said middle cylinder with a click action when said middle cylinder and said linearly movable shaft element relatively move along said rotational axis;
    wherein said click-stop mechanism comprises:
    at least one click recess formed on one of an outer peripheral surface of said middle cylinder and an inner peripheral surface of said outer cylinder;
    at least one ball accommodation hole formed on the other of an outer peripheral surface of said middle cylinder and in inner peripheral surface of said outer cylinder extending in a radial direction, said ball accommodation hole facing said click recess when the axial positions of said ball accommodation hole and said click recess are aligned;
    at least one click ball accommodated in said ball accommodation hole to be movable therein in said radial direction; and
    at least one spring accommodated in said ball accommodation hole for biasing said click ball toward a direction to engage said click recess.

2. The extendable pivot shaft mechanism according to claim 1, wherein one end of said rotatable shaft element is fixed to a pivot support member installed in said one of said grip and said camera body, another end of said rotatable shaft element comprises a radial projection, and
    wherein said middle cylinder is sandwiched between said radial projection and said pivot support member in a direction of said rotational axis to be prevented from moving in said rotational axis direction relative to said pivot support member.

3. The extendable pivot shaft mechanism according to claim 2, wherein said radial projection is integral with said rotatable shaft element.

4. The extendable pivot shaft mechanism according to claim 3, wherein said radial projection is formed as an outer flange formed integral with said rotatable shaft element.

5. The extendable pivot shaft mechanism according to claim 2, wherein said radial projection is provided as a radial member independent of said rotatable shaft element, said radial member being fixed to said rotatable shaft element during an assembling operation of said extendable pivot shaft mechanism.

6. The extendable pivot shaft mechanism according to claim 5, wherein said radial projection is formed as a ring member.

7. The extendable pivot shaft mechanism according to claim 2, wherein said linearly movable shaft element comprises at least one linear guide groove formed on a peripheral surface of said linearly movable shaft element which faces said middle cylinder to extend parallel to said rotational axis, and
    wherein said middle cylinder includes at least one radial projection which is slidably engaged in said linear guide groove.

8. The extendable pivot shaft mechanism according to claim 1, further comprising a click-stop mechanism, provided between said middle cylinder and said rotatable shaft element, for stopping said rotatable shaft element rotating about said rotational axis relative to said middle cylinder with a click action when said middle cylinder and said rotatable shaft element relatively rotate about said rotational axis.

9. The extendable pivot shaft mechanism according to claim 1, wherein said outer cylinder serves as said linearly movable shaft element:
    wherein said extendable pivot shaft mechanism includes an external cylindrical cover which is positioned around an outer peripheral surface of said outer cylinder to cover said outer opening of said ball accommodation hole, and
    wherein one end of said spring accommodated in said ball accommodation hole is in contact with an inner peripheral surface of said external cylindrical cover, and the other end of said spring is in contact with said click ball.

10. The extendable pivot shaft mechanism according to claim 1, wherein said inner shaft and said outer cylinder are fixed to said grip and said camera body, respectively.

11. The extendable pivot shaft mechanism according to claim 1, wherein said rotatable shaft element is fixed to said grip, and wherein said linearly movable shaft element is fixed to said camera body.

12. The extendable pivot shaft mechanism according to claim 1, further comprising a grip-angle holding device installed between said rotatable shaft element and said middle cylinder to apply a frictional resistance to said rotatable shaft element and said middle cylinder therebetween in a rotational direction.

13. The extendable pivot shaft mechanism according to claim 12, wherein said grip-angle holding device comprises a leaf spring.

14. The extendable pivot shaft mechanism according to claim 1, wherein said inner shaft is formed as a cylindrical member having a through-hole which extends in a direction of said rotational axis, at least one electrical connecting element, for electrically connecting said grip and said camera body with each other, extending between said grip and said camera body via said through-hole.

15. The extendable pivot shaft mechanism according to claim 14, wherein said electrical connecting element comprises a bundle of lead wires.

16. The extendable pivot shaft mechanism according to claim 1, wherein said rotational axis extends in a direction orthogonal to an optical axis of a photographing optical system of said camera which is provided in said camera body.

17. The extendable pivot shaft mechanism according to claim 1, wherein said rotatable grip comprises a shutter release button.

* * * * *